United States Patent
Dupuis et al.

(10) Patent No.: US 10,527,753 B2
(45) Date of Patent: Jan. 7, 2020

(54) METHODS AND APPARATUSES TO GENERATE A FORMATION MODEL

(71) Applicant: Schlumberger Technology Corporation, Sugar Land, TX (US)

(72) Inventors: Christophe Dupuis, Stavanger (NO); Dzevat Omeragic, Lexington, MA (US); Yong-Hua Chen, Belmont, MA (US); Tarek M. Habashy, Burlington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 742 days.

(21) Appl. No.: 15/026,533

(22) PCT Filed: Oct. 3, 2014

(86) PCT No.: PCT/US2014/059116
§ 371 (c)(1),
(2) Date: Mar. 31, 2016

(87) PCT Pub. No.: WO2015/051287
PCT Pub. Date: Apr. 9, 2015

(65) Prior Publication Data
US 2016/0245952 A1    Aug. 25, 2016

Related U.S. Application Data

(60) Provisional application No. 61/887,177, filed on Oct. 4, 2013.

(51) Int. Cl.
*G01V 99/00* (2009.01)
*G01V 3/18* (2006.01)
(Continued)

(52) U.S. Cl.
CPC .......... *G01V 99/005* (2013.01); *G01V 3/08* (2013.01); *G01V 3/18* (2013.01); *G01V 3/28* (2013.01); *G01V 3/38* (2013.01); *G06F 17/18* (2013.01)

(58) Field of Classification Search
CPC .......... G01V 99/005; G01V 3/08; G01V 3/28; G01V 3/38; G01V 3/18; G06F 17/18
(Continued)

(56) References Cited

U.S. PATENT DOCUMENTS

| 5,889,729 A | 3/1999 | Frenkel et al. | |
| 5,963,036 A * | 10/1999 | Wu | G01V 3/30 324/338 |

(Continued)

FOREIGN PATENT DOCUMENTS

| WO | 2007018810 A1 | 2/2007 |
| WO | 2013036509 A1 | 3/2013 |
| WO | 2015051287 A1 | 4/2015 |

OTHER PUBLICATIONS

"Evaluation of resistivity and seismic methods for hydrogeological mapping in karst terrains" Franjo Sumanovac et al. Elsevier Journal of Applied Geophysics 47 2001 13-28.*

(Continued)

*Primary Examiner* — Saif A Alhija

(57) ABSTRACT

Systems, methods, and apparatuses to generate a formation model are described. In one aspect, a logging system includes a transmitter to produce an electromagnetic field in a borehole, a receiver in the borehole to detect a first field signal induced by the electromagnetic field at a first depth of investigation and a second field signal induced by the electromagnetic field at a second depth of investigation, and a modeling unit to perform a first one-dimensional inversion on the first field signal and a second one-dimensional inversion on the second field signal, build a two-dimensional (Continued)

model from the first one-dimensional inversion and the second one-dimensional inversion, and perform a two-dimensional inversion on the two-dimensional model to generate a two-dimensional formation model.

17 Claims, 20 Drawing Sheets

(51) Int. Cl.
*G01V 3/38* (2006.01)
*G01V 3/28* (2006.01)
*G01V 3/08* (2006.01)
*G06F 17/18* (2006.01)

(58) Field of Classification Search
USPC .............................................. 703/6
See application file for complete search history.

(56) References Cited

U.S. PATENT DOCUMENTS

| | | |
|---|---|---|
| 2006/0095239 A1 | 5/2006 | Frenkel |
| 2006/0173624 A1 | 8/2006 | Frenkel |
| 2008/0294393 A1 | 11/2008 | Laake et al. |
| 2011/0156957 A1 | 6/2011 | Waite et al. |
| 2012/0209528 A1 | 8/2012 | Itskovich |

OTHER PUBLICATIONS

International Search Report and the Written Opinion for International Application No. PCT/US2014/059116 dated Jan. 19, 2015.
Dupuis, C. et al., "Workflow to Image Unconformities with Deep Electromagnetic LWD Measurements Enables Well Placement in Complex Scenarios", SPE 166117, presented at the SPE Annual Technical Conference and Exhibition, New Orleans, Louisiana, U.S.A., 2013, 18 pages.
Auken, E et al., "Piecewise 1D laterally constrained inversion of resistivity data", Geophysical Prospecting, 2005, 53, pp. 497-506.
Dupuis, C. et al., "Inversion-Based Workflow to Image Faults Crossed by the Wellbore Using Deep Directional Resistivity Provides New Way of Understanding Complex Formations", presented at the SPWLA 55th Annual Logging Symposium, Abu Dhabi, United Arab Emirates, 2014, 18 pages.
EP Search and Exam Report (R.164 EPC) in EP Patent Application No. 14850947.4 dated May 4, 2017, 17 pages.
Exam Report (94-3) in EP Patent Application No. 14850947.4 dated Sep. 22, 2017, 11 pages.
Search Report in related EP Patent Application No. 14850947.4 dated Aug. 29, 2017, 6 pages.
First Exam Report issued in Australian Patent Application No. 2014329354, dated Jul. 12, 2017, 2 pages.
International Preliminary Report on Patentability of International Patent Application No. PCT/US2014/059116, dated Apr. 14, 2016, 7 pages.

\* cited by examiner

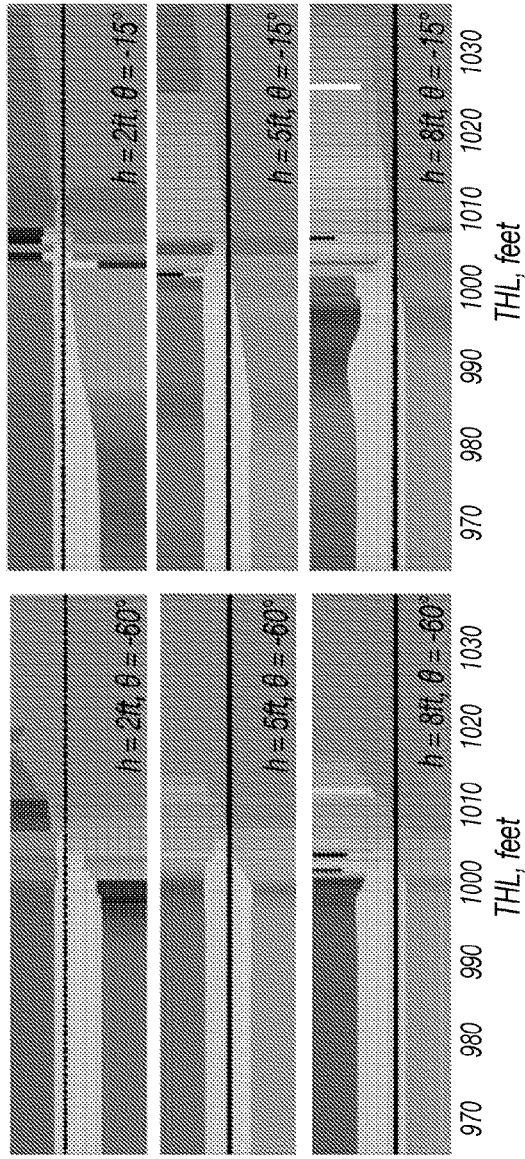
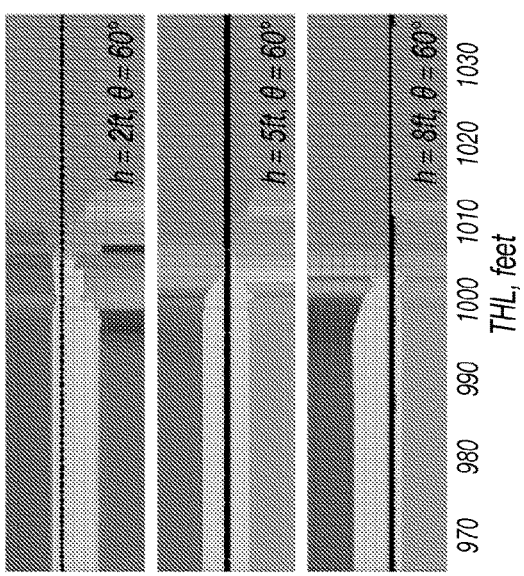
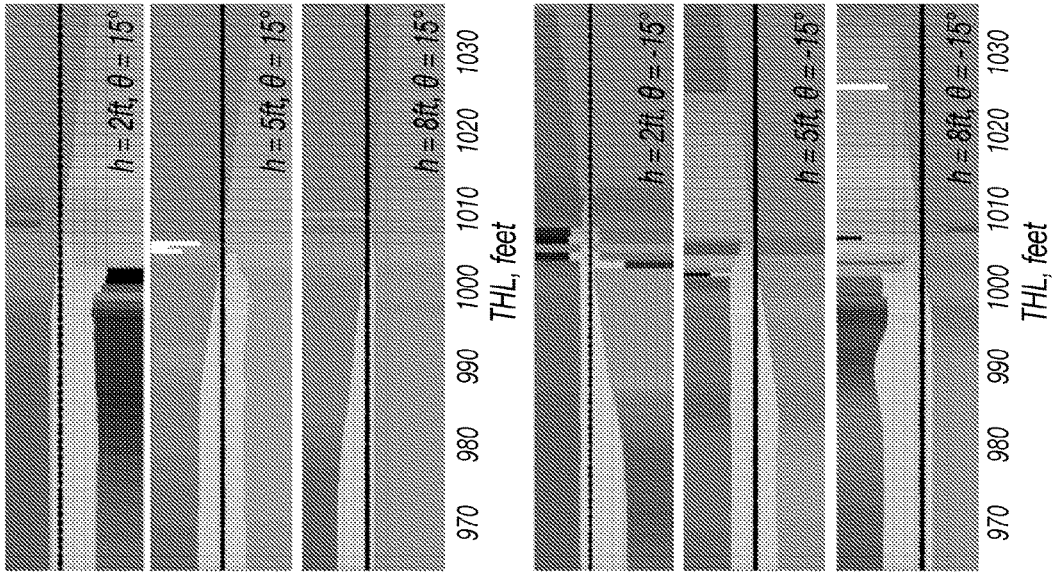
FIG. 3A    FIG. 3B
FIG. 3C    FIG. 3D fault ref. points in MD     boundary ref. points in MD

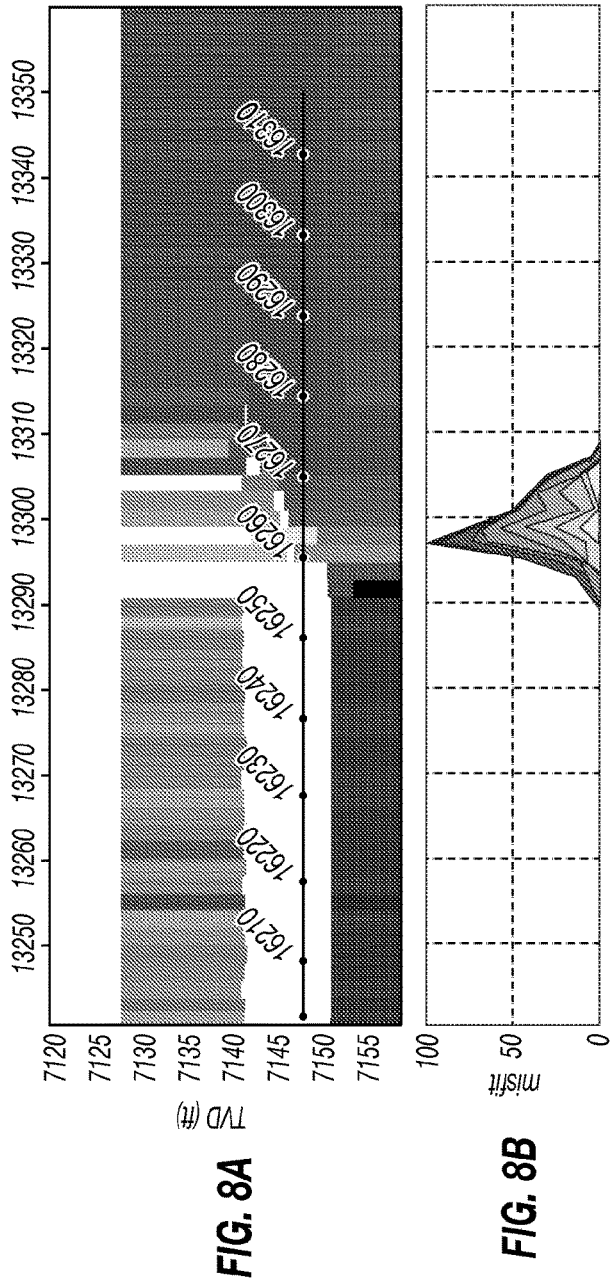
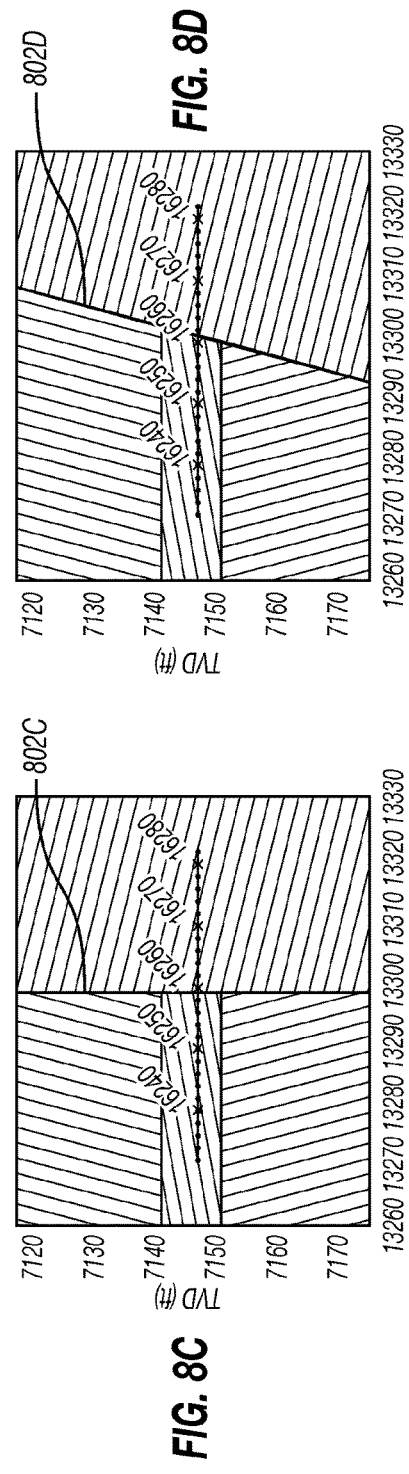
FIG. 8A
FIG. 8B
FIG. 8C
FIG. 8D

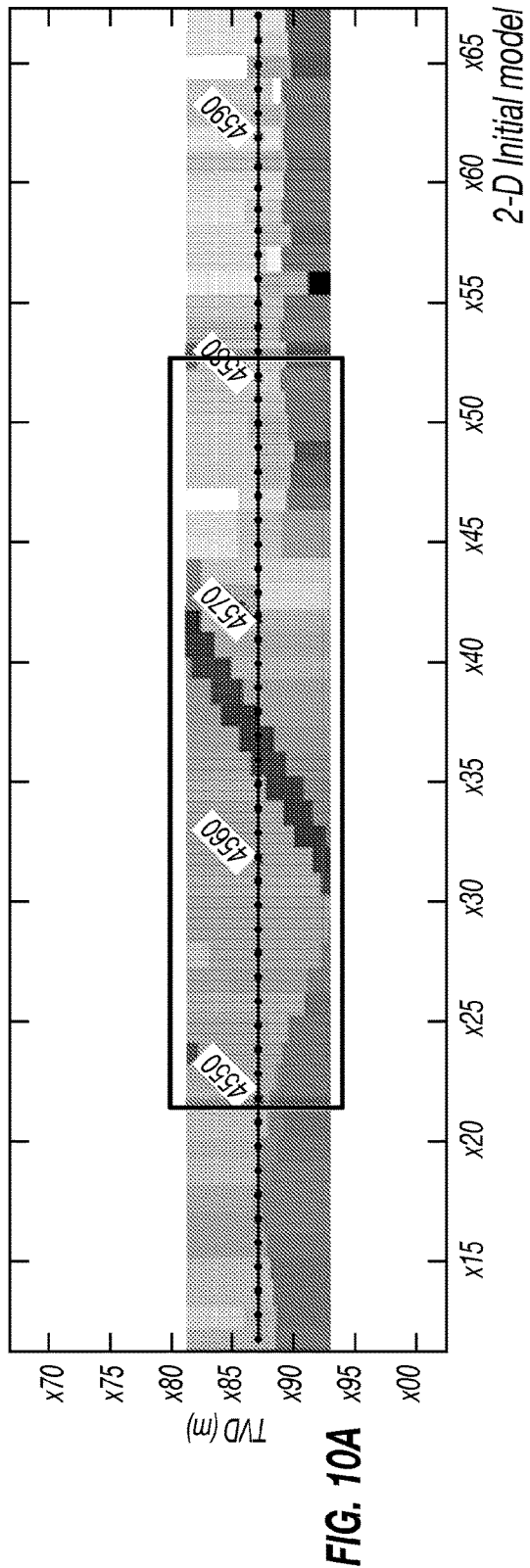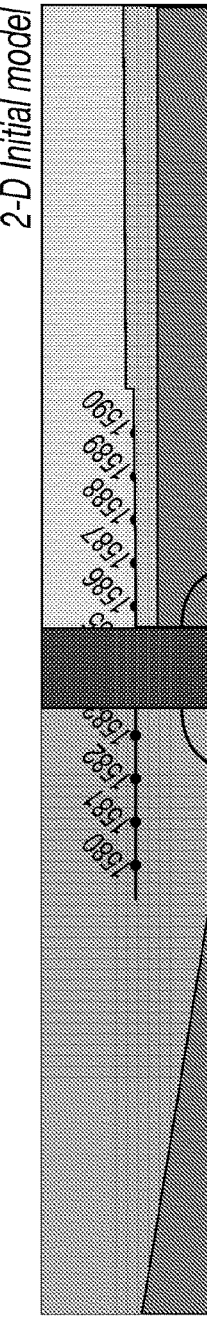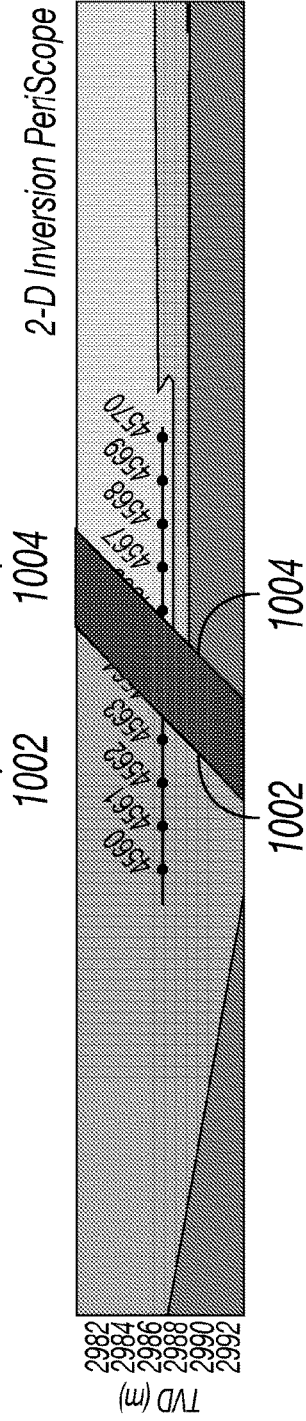
FIG. 10A
FIG. 10B
FIG. 10C

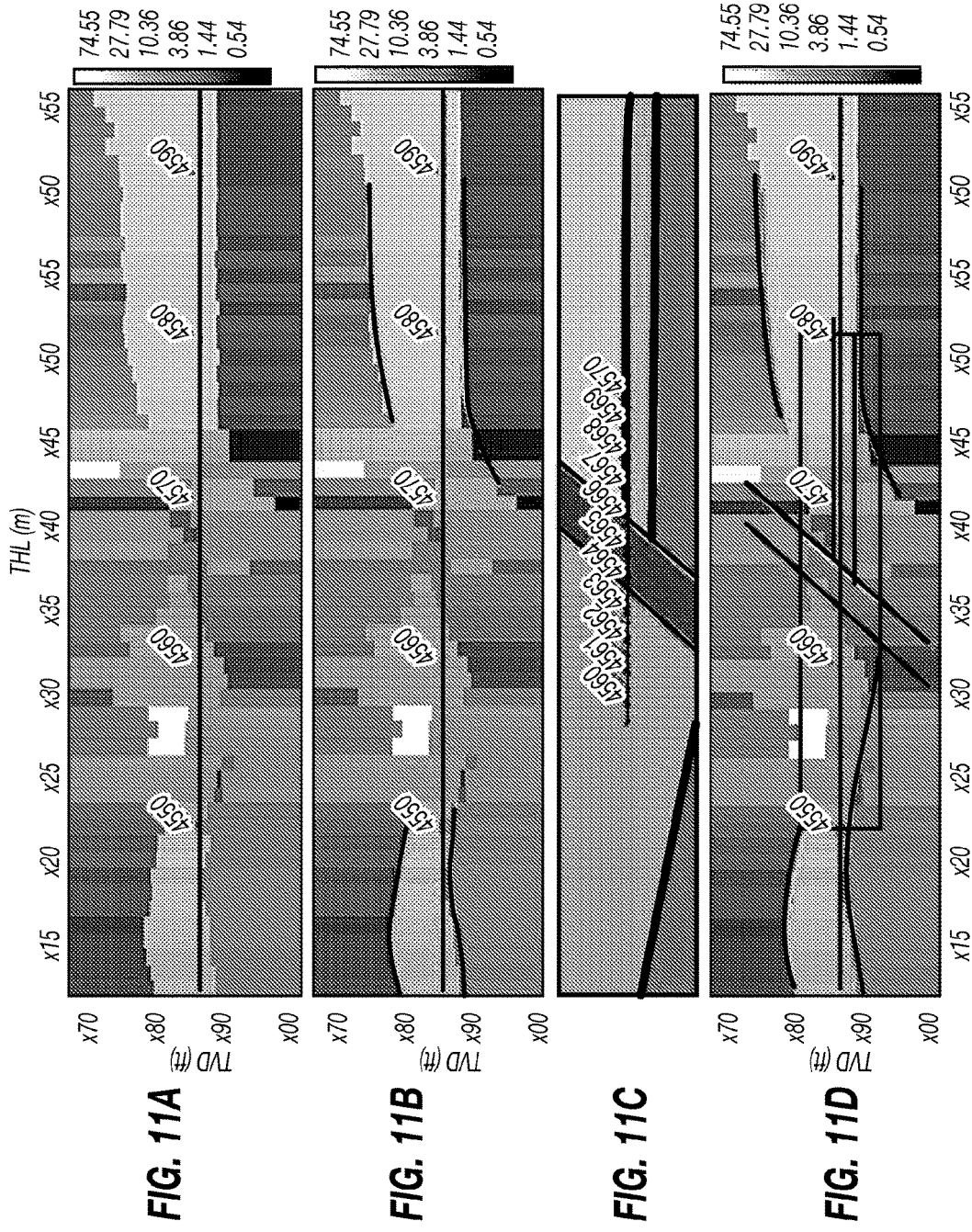

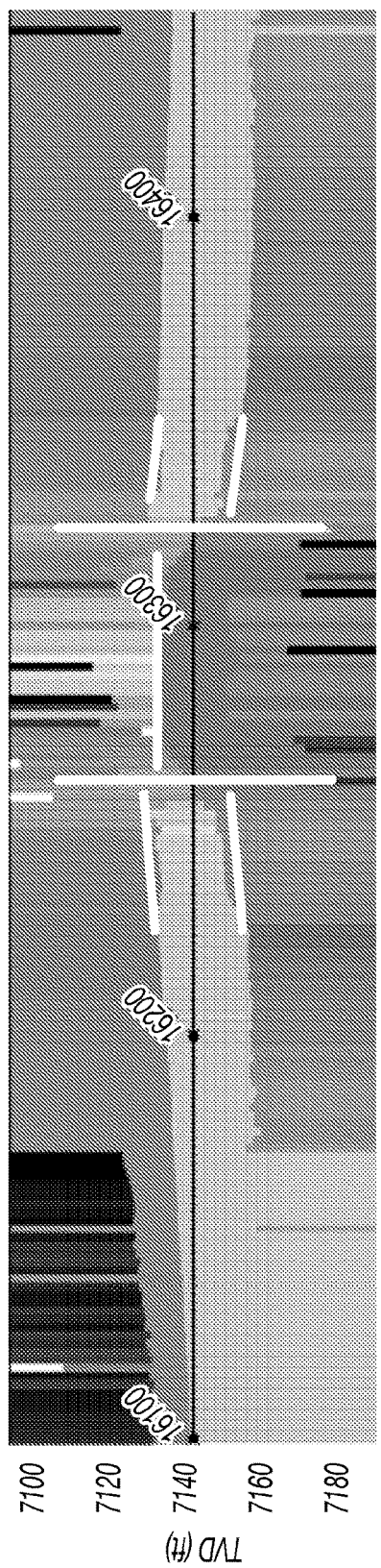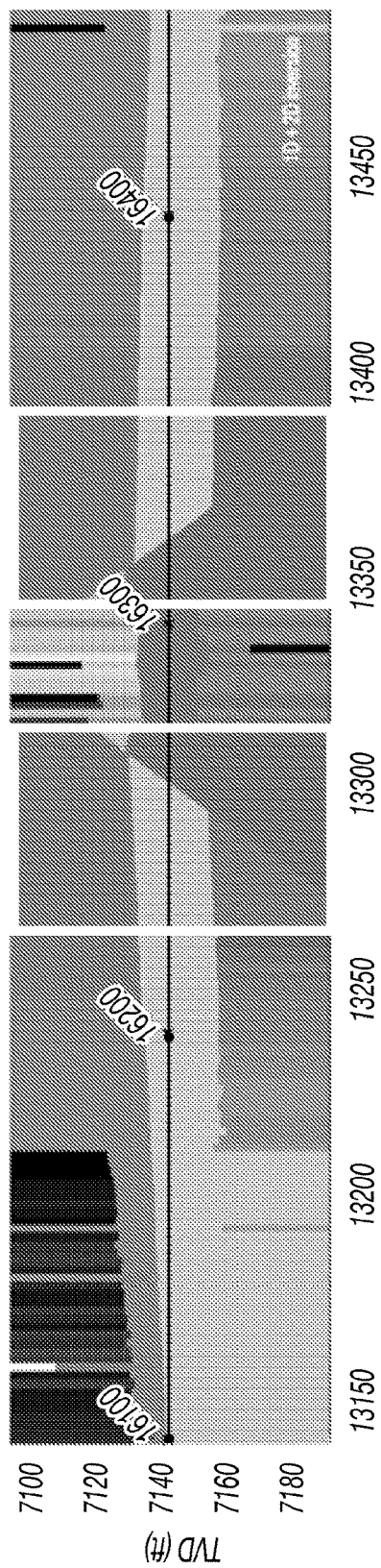
FIG. 12G
FIG. 12H

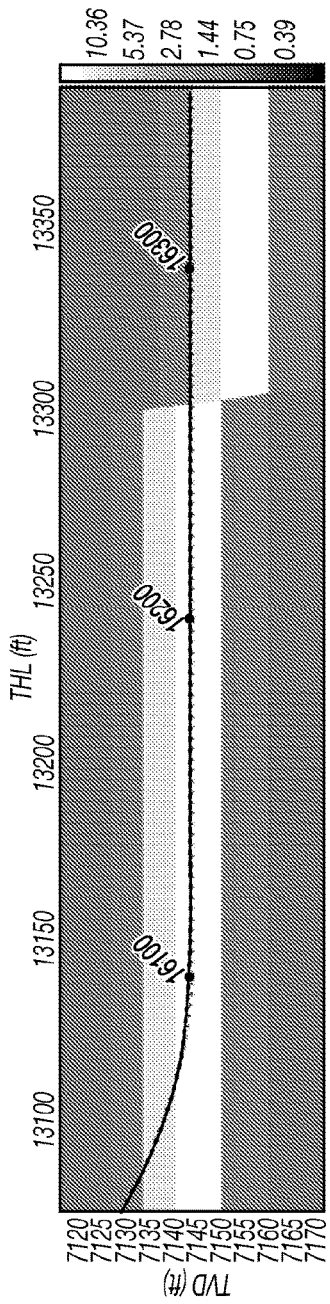
FIG. 13A
FIG. 13B
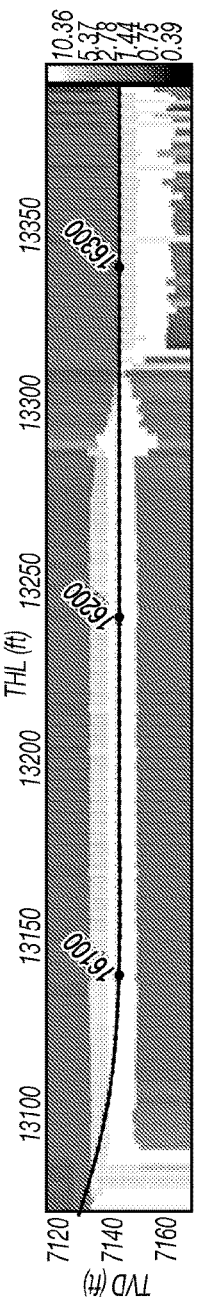
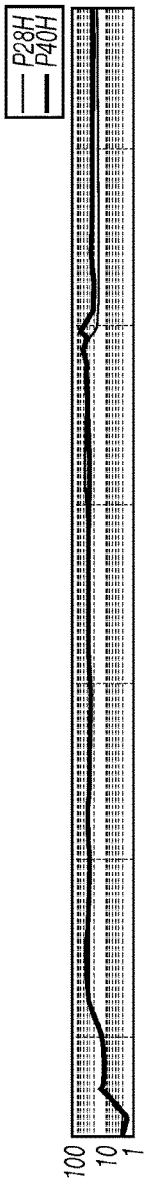
FIG. 13C
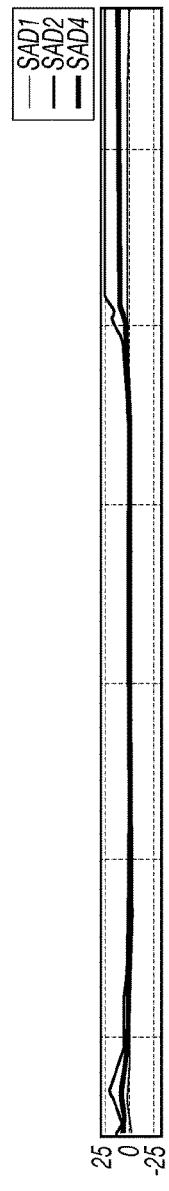
FIG. 13D
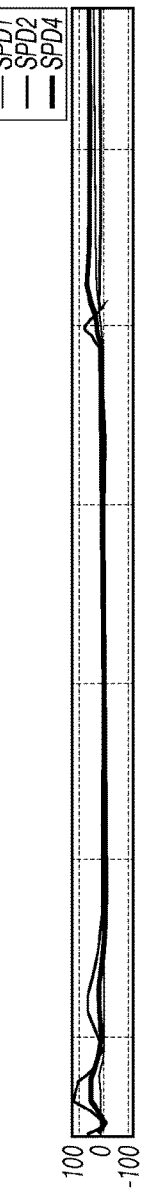
FIG. 13E

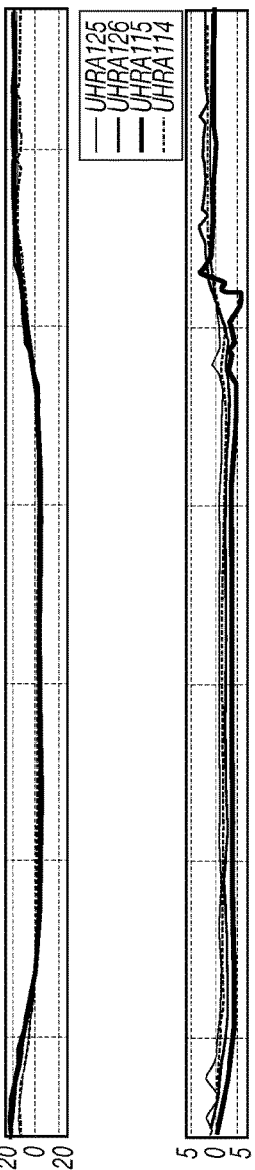
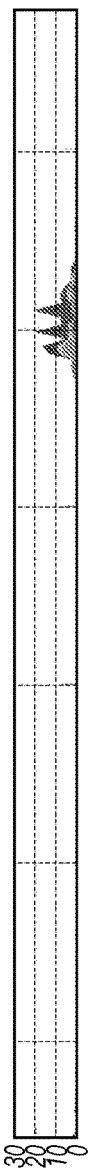
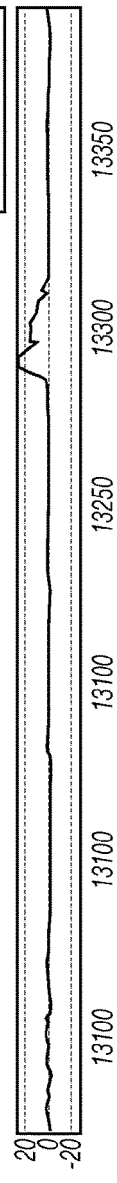
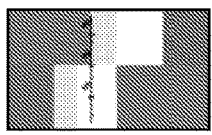
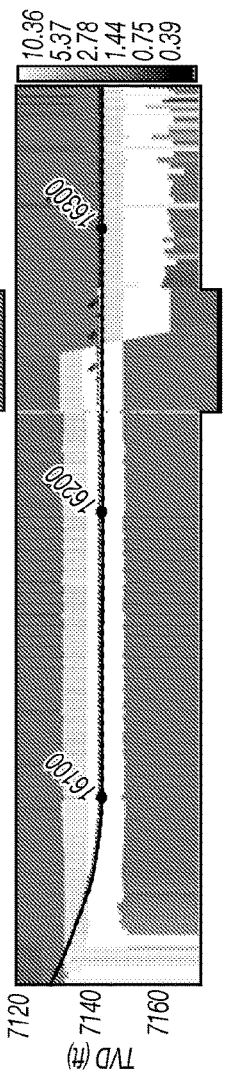
FIG. 13F
FIG. 13G
FIG. 13H
FIG. 13I
FIG. 13J
FIG. 13K

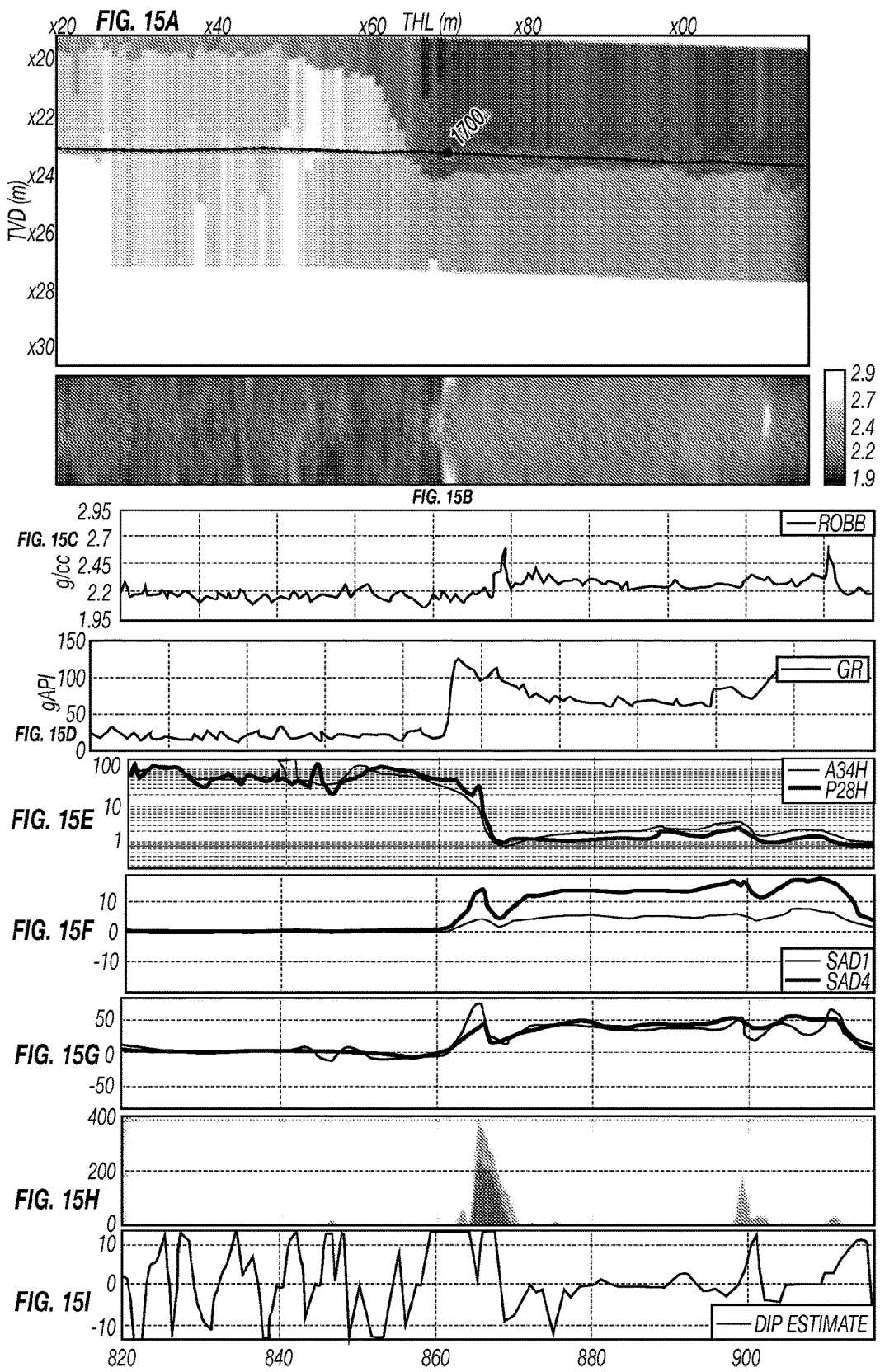

METHODS AND APPARATUSES TO GENERATE A FORMATION MODEL

CROSS-REFERENCE TO RELATED APPLICATION

This application is a non-provisional application claiming priority to and the benefit of U.S. Provisional Patent Application No. 61/887,177 filed on Oct. 4, 2013 entitled, "Inversion-based Workflow to Image Faults Crossed by the Wellbore Using Deep Directional Resistivity Provides New Way of Understanding Complex Formations", which is hereby incorporated by reference in its entirety.

TECHNICAL FIELD

The disclosure relates generally to well logging, and, more specifically, to generating a formation model.

BACKGROUND

Electromagnetic fields (e.g., combinations of an electric field and a magnetic field) may be used to determine certain properties of a substance. Oil and gas field logging tools may utilize electromagnetic fields to investigate the properties of earth formations, such as the resistivity of formations or the composition and/or presence of fluids within the formations. For example, an electromagnetic field may interact with the formation and those interactions may be detected and analyzed in order to determine information about the formation.

SUMMARY

This summary is provided to introduce a selection of concepts that are further described below in the detailed description. This summary is not intended to identify all features of the claimed subject matter, nor is it intended to be used as an aid in limiting the scope of the claimed subject matter.

In one aspect, a logging system includes a transmitter to produce an electromagnetic field (e.g., in a borehole), a receiver (e.g., in the borehole) to detect a field signal induced by the electromagnetic field at a depth of investigation, and a modeling unit to perform a one-dimensional inversion on the field signal, build a two-dimensional model from the one-dimensional inversion, and perform a two-dimensional inversion on the two-dimensional model to generate a two-dimensional formation model. In one aspect, a logging system includes a transmitter to produce an electromagnetic field (e.g., in a borehole), a receiver (e.g., in the borehole) to detect a first field signal induced by the electromagnetic field at a first depth of investigation and a second field signal induced by the electromagnetic field at a second depth of investigation, and a modeling unit to perform a first one-dimensional inversion on the first field signal and a second one-dimensional inversion on the second field signal, build a two-dimensional model from the first one-dimensional inversion and the second one-dimensional inversion, and perform a two-dimensional inversion on the two-dimensional model to generate a two-dimensional formation model. In one aspect, the first field signal is from a transmitter and receiver pair, and the second field signal may be from a transmitter and receiver pair that may share the transmitter and/or receiver that generated the first field signal. The second depth of investigation may be deeper than the first depth of investigation. A modeling unit may detect a fault intersected by or adjacent to the borehole. A modeling unit may detect multiples faults intersected by or adjacent to the borehole. A modeling unit may detect the fault(s) intersected by the borehole as a distortion in at least one of the first one-dimensional inversion and the second one-dimensional inversion. A modeling unit may include a position and a dip of the fault in the two-dimensional model. A modeling unit may adjust the position and the dip of the fault when the two-dimensional inversion is performed to generate the two-dimensional formation model.

A logging system may include (e.g., providing) a signal for at least one of formation layer resistivities, thicknesses, and dip for each formation block. A logging system may include (e.g., providing) an imaging tool (e.g., in the tool string) to provide azimuthal information and sensitivity to formation dip and azimuth to the modeling unit to perform a first one-dimensional inversion on the first field signal and a second one-dimensional inversion on the second field signal, build a three-dimensional model from the first one-dimensional inversion and the second one-dimensional inversion, and use azimuths from the image to perform a three-dimensional inversion on the two-dimensional model to generate a three-dimensional formation model.

In another aspect, a logging system may include a transmitter to produce an electromagnetic field (e.g., in a borehole), a receiver (e.g., in the borehole) to detect a first field signal induced by the electromagnetic field at a first depth of investigation and a second field signal induced by the electromagnetic field at a second depth of investigation, and a modeling unit to perform a first one-dimensional inversion on the first field signal and a second one-dimensional inversion on the second field signal, build a first two-dimensional model from the first one-dimensional inversion, perform a first two-dimensional inversion on the first two-dimensional model, build a second two-dimensional model from the first one-dimensional inversion and the first two-dimensional inversion, and perform a second two-dimensional inversion on the second two-dimensional model to generate a two-dimensional formation model. A modeling unit may detect a fault intersected by the borehole. The second depth of investigation may be deeper than the first depth of investigation. A modeling unit may detect the fault intersected by the borehole as a distortion in at least one of the first one-dimensional inversion and the second one-dimensional inversion. A modeling unit may include a position and a dip of the fault in the two-dimensional model. A modeling unit may adjust the position and the dip of the fault when the two-dimensional inversion is performed to generate the two-dimensional formation model.

In yet another aspect, a method includes producing an electromagnetic field in a borehole, detecting a first field signal induced by the electromagnetic field at a first depth of investigation and a second field signal induced by the electromagnetic field at a second depth of investigation, performing a first one-dimensional inversion on the first field signal and a second one-dimensional inversion on the second field signal, building a two-dimensional model from the first one-dimensional inversion and the second one-dimensional inversion, and performing a two-dimensional inversion on the two-dimensional model to generate a two-dimensional formation model. The method may include detecting a fault intersected by the borehole. The detecting may include detecting the fault intersected by the borehole as a distortion in at least one of the first one-dimensional inversion and the second one-dimensional inversion. The building the two-dimensional model may include including a position and a dip of the fault in the two-dimensional model. The performing the two-dimensional inversion may include adjusting the position and the dip of the fault.

In another aspect, a method includes producing an electromagnetic field in a borehole, detecting a first field signal induced by the electromagnetic field at a first depth of investigation and a second field signal induced by the electromagnetic field at a second depth of investigation, performing a first one-dimensional inversion on the first field signal and a second one-dimensional inversion on the second field signal, building a first two-dimensional model from the first one-dimensional inversion, performing a first two-dimensional inversion on the first two-dimensional model, building a second two-dimensional model from the first one-dimensional inversion and the first two-dimensional inversion, and performing a second two-dimensional inversion on the second two-dimensional model to generate a two-dimensional formation model. The method may include detecting a fault intersected by the borehole. The detecting may include detecting the fault intersected by the borehole as a distortion in at least one of the first one-dimensional inversion and the second one-dimensional inversion. The building of at least one of the first two-dimensional model and the second two-dimensional model may include including a position and a dip of the fault in the at least one of the first two-dimensional model and the second two-dimensional model. At least one or both of the performing the first two-dimensional inversion and the performing the second two-dimensional inversion may include adjusting the position and the dip of the fault.

In yet another aspect, an apparatus includes a set of one or more processors, and a set of one or more data storage devices that store instructions, that when executed by the set of processors, cause the set of one or more processors to perform the following: producing an electromagnetic field in a borehole, detecting a first field signal induced by the electromagnetic field at a first depth of investigation and a second field signal induced by the electromagnetic field at a second depth of investigation, performing a first one-dimensional inversion on the first field signal and a second one-dimensional inversion on the second field signal, building a two-dimensional model from the first one-dimensional inversion and the second one-dimensional inversion, and performing a two-dimensional inversion on the two-dimensional model to generate a two-dimensional formation model. The set of data storage devices may further store instructions, that when executed by the set of processors, cause the set of processors to perform the following: detecting a fault intersected by the borehole. The set of data storage devices may further store instructions, that when executed by the set of processors, cause the set of processors to perform the following: wherein the detecting includes detecting the fault intersected by the borehole as a distortion in at least one of the first one-dimensional inversion and the second one-dimensional inversion. The set of data storage devices may further store instructions, that when executed by the set of processors, cause the set of processors to perform the following: wherein the building the two-dimensional model includes including a position and a dip of the fault in the two-dimensional model. The set of data storage devices may further store instructions, that when executed by the set of processors, cause the set of processors to perform the following: wherein the performing the two-dimensional inversion includes adjusting the position and the dip of the fault.

In another aspect, an apparatus includes a set of one or more processors, and a set of one or more data storage devices that store instructions, that when executed by the set of processors, cause the set of one or more processors to perform the following: producing an electromagnetic field in a borehole, detecting a first field signal induced by the electromagnetic field at a first depth of investigation and a second field signal induced by the electromagnetic field at a second depth of investigation, performing a first one-dimensional inversion on the first field signal and a second one-dimensional inversion on the second field signal, building a first two-dimensional model from the first one-dimensional inversion, performing a first two-dimensional inversion on the first two-dimensional model, building a second two-dimensional model from the first one-dimensional inversion and the first two-dimensional inversion, and performing a second two-dimensional inversion on the second two-dimensional model to generate a two-dimensional formation model. The set of data storage devices may further store instructions, that when executed by the set of processors, cause the set of processors to perform the following: detecting a fault intersected by the borehole. The set of data storage devices may further store instructions, that when executed by the set of processors, cause the set of processors to perform the following: wherein the detecting includes detecting the fault intersected by the borehole as a distortion in at least one of the first one-dimensional inversion and the second one-dimensional inversion. The set of data storage devices may further store instructions, that when executed by the set of processors, cause the set of processors to perform the following: wherein the building of at least one of the first two-dimensional model and the second two-dimensional model includes including a position and a dip of the fault in the at least one of the first two-dimensional model and the second two-dimensional model. The set of data storage devices may further store instructions, that when executed by the set of processors, cause the set of processors to perform the following: wherein at least one of the performing the first two-dimensional inversion and the performing the second two-dimensional inversion includes adjusting the position and the dip of the fault.

In yet another aspect, a logging system includes means to produce an electromagnetic field in a borehole, means to detect a first field signal induced by the electromagnetic field at a first depth of investigation and a second field signal induced by the electromagnetic field at a second depth of investigation, and means to perform a first one-dimensional inversion on the first field signal and a second one-dimensional inversion on the second field signal, build a two-dimensional model from the first one-dimensional inversion and the second one-dimensional inversion, and perform a two-dimensional inversion on the two-dimensional model to generate a two-dimensional formation model.

In another aspect, a logging system may include means to produce an electromagnetic field in a borehole, means to detect a first field signal induced by the electromagnetic field at a first depth of investigation and a second field signal induced by the electromagnetic field at a second depth of investigation, and means to perform a first one-dimensional inversion on the first field signal and a second one-dimensional inversion on the second field signal, build a first two-dimensional model from the first one-dimensional inversion, perform a first two-dimensional inversion on the first two-dimensional model, build a second two-dimensional model from the first one-dimensional inversion and the first two-dimensional inversion, and perform a second two-dimensional inversion on the second two-dimensional model to generate a two-dimensional formation model.

BRIEF DESCRIPTION OF THE DRAWING

The present disclosure is illustrated by way of example and not limitation in the figures of the accompanying drawings, in which like references indicate similar elements and in which:

FIGS. 3A-3D illustrate aspects of distortions caused by a two-dimensional fault event on a one-dimensional inversion of directional resistivity measurement data.

FIG. 8A illustrates an aspect of the graphical results of a station-by-station one-dimensional inversion.

FIG. 8B illustrates an aspect of the graphical results of a distortion in the station-by-station one-dimensional inversion of FIG. 8A.

FIG. 8C illustrates an aspect of a two-dimensional model built from the one-dimensional inversion of FIG. 8A.

FIG. 8D illustrates an aspect of a two-dimensional formation model generated from the two-dimensional inversion of the two-dimensional model in FIG. 8C.

FIG. 10A illustrates an aspect of the graphical results of a one-dimensional inversion.

FIG. 10B illustrates an aspect of a two-dimensional model built from the one-dimensional inversion of FIG. 10A.

FIG. 10C illustrates an aspect of a two-dimensional formation model generated from the two-dimensional inversion of the two-dimensional model in FIG. 10B.

FIG. 11A illustrates an aspect of the graphical results of a one-dimensional inversion.

FIG. 11B illustrates an aspect of the graphical results of the extraction of boundaries from locally one-dimensional results away from the fault zone.

FIG. 11C illustrates an aspect of a two-dimensional model built from a shallow one-dimensional inversion.

FIG. 11D illustrates an aspect of a two-dimensional model built from a deep one-dimensional inversion and a shallow two-dimensional inversion.

FIG. 12G illustrates an aspect of a two-dimensional model built from a deep one-dimensional inversion and a shallow one-dimensional inversion.

FIG. 12H illustrates an aspect of a two-dimensional formation model generated from the two-dimensional inversion of the two-dimensional model in FIG. 12G.

FIG. 13A illustrates an aspect of a formation data set with a fault and a six layer structure on each side of the fault.

FIG. 13B illustrates an aspect of the graphical results of a one-dimensional inversion.

FIG. 13C illustrates an aspect of the graphical results of a one-dimensional inversion response reconstruction of resistivity.

FIG. 13D illustrates an aspect of the graphical results of symmetrized directional attenuations.

FIG. 13E illustrates an aspect of the graphical results of symmetrized directional phase shifts.

FIG. 13F illustrates an aspect of the graphical results of symmetrized directional attenuations.

FIG. 13G illustrates an aspect of the graphical results of harmonic resistivity attenuations.

FIG. 13H illustrates an aspect of the graphical results of a distortion.

FIG. 13I illustrates an aspect of the graphical results of an estimated dip.

FIG. 13J illustrates an aspect of a two-dimensional model built from a station-by-station joint or sequential one-dimensional inversion of shallow and deep sensing data.

FIG. 13K illustrates an aspect of a two-dimensional formation model generated from the two-dimensional inversion of the two-dimensional model in FIG. 13J and one-dimensional model in FIG. 13B.

FIG. 15A illustrates an aspect of the graphical results of a one-dimensional inversion.

FIG. 15B illustrates an aspect of a density image.

FIG. 15C illustrates an aspect of the graphical results of the bottom quadrant density.

FIG. 15D illustrates an aspect of the graphical results of a gamma ray log.

FIG. 15E illustrates an aspect of the graphical results of a one-dimensional inversion response reconstruction of resistivity measurements.

FIG. 15F illustrates an aspect of the graphical results of a one-dimensional inversion response reconstruction of symmetrized directional attenuations.

FIG. 15G illustrates an aspect of the graphical results of a one-dimensional inversion response reconstruction of symmetrized directional phase shifts.

FIG. 15H illustrates an aspect of the graphical results of a distortion.

FIG. 15I illustrates an aspect of the graphical results of an estimated dip.

DETAILED DESCRIPTION

In the following description, numerous specific details are set forth. However, it is understood that aspects of the disclosure may be practiced without these specific details. In other instances, well-known circuits, structures, and techniques have not been shown in detail in order not to obscure the understanding of this description.

References in the specification to "one aspect," "an aspect," "an example aspect," etc., indicate that the aspect described may include a particular feature, structure, or characteristic, but all aspects may not necessarily include the particular feature, structure, or characteristic. Such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

Figure 1:
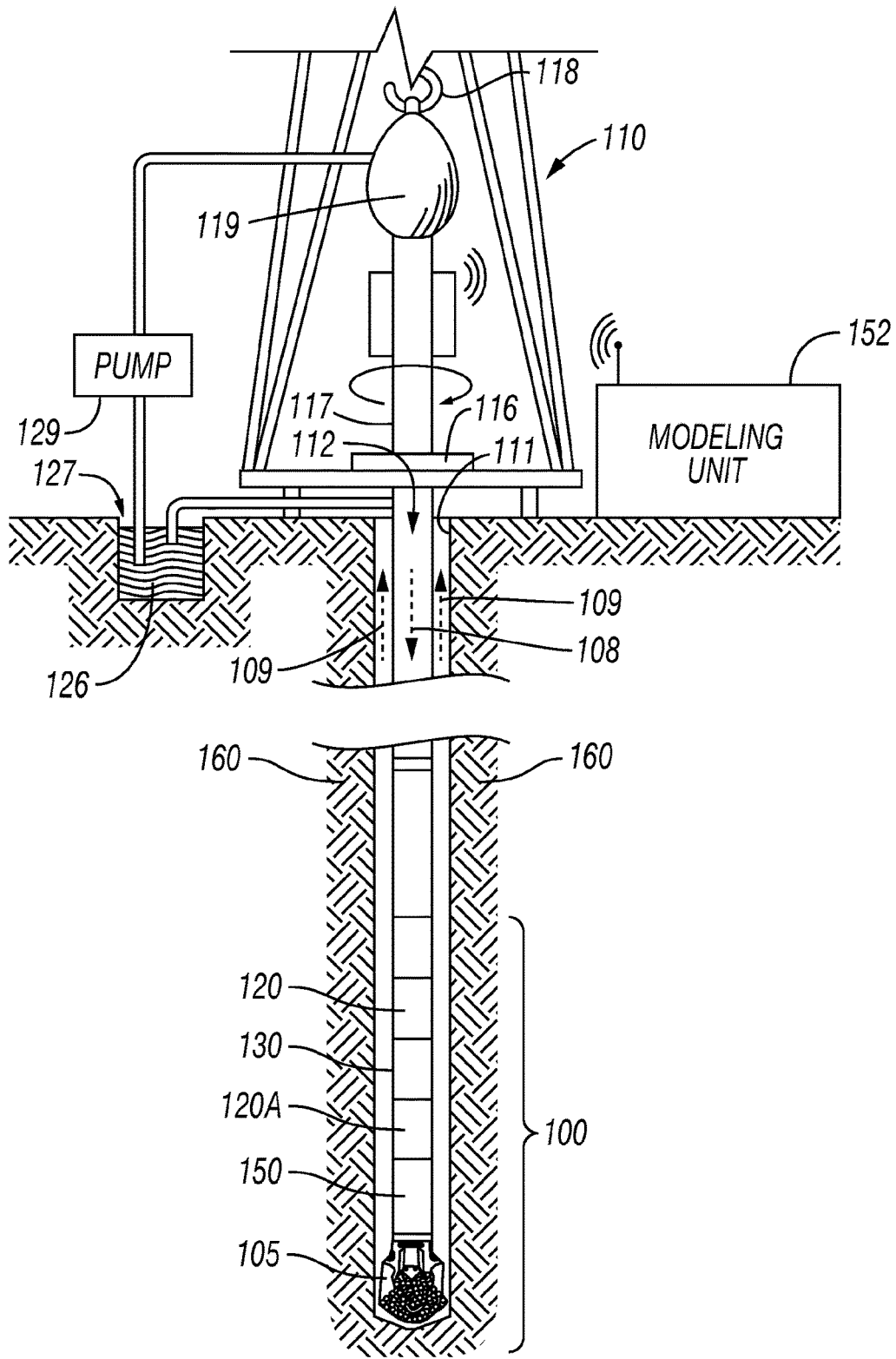
FIG. 1 illustrates an aspect of a schematic of a logging system.

FIG. 1 illustrates a schematic of a logging system 110. The well site system depicted in FIG. 1 may be deployed in either onshore or offshore applications. In this depicted system, a borehole 111 is formed in a subsurface formation 160 by rotary drilling in a manner that is well known to those skilled in the art. Some aspects may also use directional drilling.

Depicted drill string 112 is suspended within the borehole 111 and has a bottom hole assembly (BHA) 100 which includes a drill bit 105 at its lower end. The surface system includes a platform and derrick assembly positioned over the borehole 111, with the assembly including a rotary table 116, kelly 117, hook 118, and rotary swivel 119 (which in certain aspects may be part of a topdrive drilling motor). In a drilling operation, the drill string 112 may be rotated, e.g. by the rotary table 116 or a topdrive motor. Depicted drill string 112 is suspended from a hook 118, attached to a traveling block (not shown), through the rotary swivel 119 which permits rotation of the drill string 112 relative to the formation 160.

Drilling fluid (e.g., mud) 26 may be stored in a pit 127 formed at the well site. Depicted pump 129 pumps the drilling fluid 126 into the bore of the drill string 112, which causes the drilling fluid 126 to flow downwardly through the drill string 112, as indicated by the directional arrow 108 in FIG. 1. The drilling fluid may exit the drill string 112 via ports in the drill bit 105, and then circulate upwardly through the annulus formed between the outside of the drill string 112 and the inner wall of the borehole 111, as indicated by the directional arrows 109. In this known manner, the drilling fluid may lubricate the drill bit 105 and carry formation cuttings up to the surface as it is returned to the pit 127 for recirculation. In certain aspects, a downhole mud motor 150 may be utilized to rotate the drill bit 105.

Depicted drill string 112 includes a BHA 100 having one measurement while drilling (MWD) module 130 and multiple logging while drilling (LWD) modules 120 (with reference character 120A depicting a second LWD module 120). A single MWD module, a single LWD module, or any combination thereof may be utilized. As used herein, the term "module" as applied to MWD and LWD devices generally refers to either a single tool or a suite of multiple tools contained in a single modular device. Additionally, the depicted BHA 100 includes a rotary steerable system (RSS) including a mud motor 150 to rotate a drill bit 105.

LWD module(s) may be housed in a drill collar and may include one or more types of logging tools. For example, a LWD module may include capabilities for measuring, processing, and storing information, as well as for communicating with the surface equipment. By way of example, the LWD module 120 may include an electromagnetic logging tool, and may include capabilities for measuring, processing, and/or storing information and/or for communicating (e.g., wirelessly or via mud pulse) with surface equipment. A logging system 110 may include a modeling unit 152. A modeling unit may include capabilities for measuring, processing, and/or storing information and/or for communicating (e.g., wirelessly or via mud pulse) with the downhole equipment. Although the modeling unit 152 is depicted at the surface of the formation 160, portions of or the entire modeling unit may be disposed in the borehole 111, e.g., with the drill string 112. Logging system may also include one or more other logging devices, for example, a gamma logging device (e.g., module 120 and/or 120A) or an image logging device (e.g., module 120 and/or 120A).

Depicted MWD module 130 is also housed in a drill collar, and may contain one or more devices for measuring characteristics of the drill string and drill bit. A MWD module 130 may include one or more of the following types of measuring devices: a weight-on bit measuring device, a torque measuring device, a vibration measuring device, a shock measuring device, a stick/slip measuring device, a direction measuring device, and an inclination measuring device (the latter two sometimes being referred to collectively as a D&I package). The BHA 100 may further include an apparatus (not shown) for generating (e.g., electrical) power for the downhole system. For example, power generated by the MWD tool 130 may be used to power the MWD tool 130 and/or the LWD tool(s) 120 (120A). In some aspects, this apparatus may include a mud turbine generator powered by the flow of the drilling fluid 126. It is understood, however, that other power systems (e.g., a battery) may be employed.

The operation of the assembly of FIG. 1 may be controlled using a control system, e.g., located at the surface. Control system may be part of or separate from modeling unit 152. A control system may include one or more processor-based computing systems. A processor may include a microprocessor, programmable logic devices (PLDs), field-gate programmable arrays (FPGAs), application specific integrated circuits (ASICs), system-on a-chip processors (SoCs), or any other suitable integrated circuit capable of executing encoded instructions stored on data storage device(s), for example, on tangible computer-readable media (e.g., read memory, random access memory, a hard drive, optical disk, flash memory, etc.). Such instructions may correspond to, for instance, workflows and the like for carrying out a drilling operation, a logging operation, algorithms and routines for processing data received at the surface from the BHA 100 (for example, as part of an inversion to determine (e.g., obtain) one or more desired formation parameters), and so forth.

A logging system (e.g., 110 in FIG. 1) may include a modeling unit 152, e.g., including one or more processor-based computing systems. A modeling unit may be hardware, software, firmware, or any combination thereof. For example, a modeling unit module may include software, such as modeling unit module 1804 stored in memory 1802 in FIG. 18, to generate a formation model.

In one aspect, logging system includes a transmitter to produce an electromagnetic field, e.g., in the borehole, and a receiver to detect (e.g., sense) a field signal induced in the formation 160 by the electromagnetic field. One or more transmitters (e.g., antennas) may be included, e.g., as modules (120,120A,130), in drill string 112. One or more receivers (e.g., antennas) may be included, e.g., as modules (120,120A,130), in drill string 112. A transmitter and receiver may be utilized to detect (e.g., communicate the detected data) the resistivity of the formation 160 surrounding the borehole 111. In one aspect, LWD modules are axially spaced apart, e.g., eight feet apart or more. In one aspect, the LWD module(s) includes a first pair of transmitting and receiving antennas, and optionally a second pair of transmitting and receiving antennas. The second pair of antennas may be symmetric with respect to the first pair of antennas. The antennas may allow for (e.g., a controller and/or data recording device) to acquire the (e.g., induced field signal) data. A LWD module may include an axial, tilted, and/or transverse dipole antenna or antennas. Electromagnetic antennas (e.g., of LWD module(s)) with dipole moments may be oriented to be sensitive: (i) primarily to "horizontal resistivity" (Rh), which generally refers to electrical resistivity of a rock formation measured parallel to the attitude of the formation layer (e.g., bedding plane), (ii) primarily to "vertical resistivity" ($R_v$) or resistivity anisotropy, which generally refers to electrical resistivity measured perpendicularly to the bedding plane, and/or (iii) be able to make or synthesize "symmetric" and "anti-symmetric" cross dipole measurements (e.g., measurements that amplify or reduce sensitivity to the distance to nearby bed boundaries or direction and magnitude of formation dip and resistivity anisotropy with respect to the wellbore/instrument longitudinal axis). A logging system (e.g., the drill string 112) may further includes instruments to perform various other measurement functions, for example, measurements of the natural radiation, density (gamma ray or neutron), and/or pore pressure of the formation 160. Dip may generally refer to the formation bedding attitude. A bed may generally refer to a formation layer.

A borehole (e.g., wellbore) may be formed as known to one of ordinary skill in the art. Boreholes may be illustrated as straight boreholes, although they may be curved or otherwise shaped. Borehole may be cased (e.g., lined with a tubular such as metal pipe) or uncased (e.g., having an earthen interior wall). A borehole may include horizontal section(s).

Although numerical terms, such as first, second, third, etc., are used in this disclosure, this is for the convenience of reference and should not imply the presence of the other (e.g., lower) numbered components. For example, referring to a component (e.g., receiver or borehole) as a "second" component does not mean the presence of the "first" component.

A receiver may be disposed (e.g., suspended) in a borehole in any manner, for example, via a wireline or a drill string (e.g., in a module as shown in FIG. 1). Receiver may communicate (e.g., with modeling unit) through a communication line and/or wirelessly, e.g., via radio waves. Receiver may include a communications unit that collects the data (e.g., signals) from a sensor of the receiver and transmits it. For example, the data may be transmitted to a processing unit. A signal may generally refer to any information that may be transmitted and/or received.

A transmitter may be disposed (e.g., suspended) in a borehole in any manner, for example, via a wireline or a drill string (e.g., in a module as shown in FIG. 1). A transmitter may produce a signal, such as an electromagnetic field. Particularly, a transmitter may produce an electromagnetic field from an induction coil. An electromagnetic field produced may interact with the earth (e.g., different layers of a formation which may include a hydrocarbon bearing zone of interest) to induce a different electromagnetic field. The induced electromagnetic field(s) may vary (e.g., with depth and/or lateral spacing) from the transmitted electromagnetic field and signals from the induced electromagnetic field(s) may be detected (e.g., using a sensor). A data set of these field signals may be utilized to determine information about the section of earth (e.g., a formation) where the electromagnetic field was induced. Electromagnetic tomography may be utilized (e.g., based on induction physics and tomographic principles, laterolog, or other electrode type tool principles) to create a model (e.g., a 1-dimensional, 2-dimensional, or 3-dimensional map type of model) of the electrical conductivity or resistivity of the formation. Electromagnetic tomography may be used for oil and gas reservoir characterization and/or to map water and steam saturation (e.g., to determine the resistivity, permeability, or permittivity of the zone of interest between the boreholes).

Depicted modules (120,120A,130) are illustrated as having the same length, although they may be of differing lengths. In one aspect, receivers and/or transmitters are spaced at least 1, 2, 3, 4, 5, 6, 7, 8, 10, 11, 12, 13, 14, 15, 20, 30, 40, 50, 60, 70, 80, 90, 100, 110, 120 feet apart.

Receiver may include a sensor of any type, for example, a sensor that detects an electrical field and/or a magnetic field induced in the earth, e.g., induced by a transmitted electromagnetic field. In one aspect, a sensor is a magnetometer. In one aspect, a sensor is an antenna, e.g., a coil of wire having "n" turns. Receiver may be an induction coil wrapped around a metal (e.g., steel) core. Receiver may be an induction coil not wrapped around a core (e.g., an air core). A sensor may output a signal corresponding to a measured strength (e.g., an amplitude) and/or direction (e.g., phase angle) of a field. A sensor may be a fluxgate magnetometer. In one aspect, a multiple axis sensor may be used. A multiple axis sensor may include three orthogonal magnetometers (e.g., arranged to provide three discrete outputs, each corresponding to the x, y, or z component of the xyz Cartesian coordinate system). In one aspect, a logging system includes three orthogonal transmitters and the borehole contains at least one set of three orthogonal receivers that are similarly aligned with a respective transmitter. For example, in such an aspect, data corresponding to a field produced in a direction (e.g., in the x, y, or z direction of the xyz Cartesian coordinate system) from a transmitter and an induced field signal received in the same direction (e.g., in the x, y, or z direction of the xyz Cartesian coordinate system) with a receiver in each of a plurality of wells is generated (and optionally recorded).

Transmitter 108 may be any transmitter that produces a desired output, e.g., an electromagnetic field. Transmitter may include a set of induction coils, e.g., powered by a power source (not shown). Transmitter (e.g., a power source thereof) may generate an electromagnetic field by any method, including, but not limited to, direct current (e.g., electrical or resistivity) methods, induced polarization methods, microwave frequency (ground-penetrating radar) methods, and natural electromagnetic fields (e.g., magnetotelluric) methods. In one aspect, a transmitter is an induction coil having multiple turns ("n") to provide a desired magnetic moment. Transmitter may be an induction coil wrapped around a metal (e.g., steel) core. Transmitter may be an induction coil not wrapped around a core (e.g., an air core).

The acquired data may also include various measurements that are derived from the antenna (e.g., transmitter and/or receiver) couplings. These measurements may include, for example, symmetrized directional amplitude (USDA) and symmetrized directional phase (USDP), anti-symmetrized directional amplitude (UADA) and anti-symmetrized directional phase (UADP), harmonic resistivity amplitude (UHRA) and harmonic resistivity phase (UHRP), and/or harmonic anisotropy amplitude (UHAA) and harmonic anisotropy phase (UHAP). Other measurements combinations with directional (e.g., up to quadrant sensitivities) may be composed from available couplings. The methodology may be applicable to other types of processed data.

The use of (e.g., deep) directional electromagnetic measurements for well placement may be based on the application of a real-time automatic multilayer inversion. In one aspect, a (e.g., graphical) formation model is created by (e.g., fitting constants) using an inversion procedure. One example of an inversion procedure is a Gauss-Newton least-squares method, e.g., for 1-D or 2-D inversion of (e.g., resistivity) data. In one aspect, a resistivity model (e.g., derived from prior knowledge of the formation area) and a forward electromagnetic code may use an inversion procedure to calculate a model response and then adjust the model parameters (e.g., to-be-determined constants) until the observed and calculated data fit within a specified tolerance (e.g., sometimes referred to as $\varepsilon$). A tolerance may be a value of the least mean squares, as is known in the art. In one aspect, the tolerance is less than 0.05 or 0.01, i.e., 5% or 1%, respectively. For example, by utilizing the principles of electromagnetic induction and tomography, an image (e.g., 1-D, 2-D, 3-D, or 4-D) formation model (e.g., of the resistivity distribution in a formation) may be generated.

A basic assumption behind an inversion-based interpretation may be that a one-dimensional (1-D) layered medium may be used to fit the data locally. However, in certain aspects, such an assumption may not hold. Faulted formations are encountered in most horizontal drilling projects, whether the wells are geosteered or not. Since a fault may generally be seen (e.g., in a formation model) as a discontinuity in a layered formation, it may not fit the 1-D assumption to be accurately imaged with a 1-D inversion. In one aspect, long-spacing (e.g., about 8 ft. to 120 ft.) deep reading tools are used and the presence of faults may distort the 1-D inversion results, e.g., within several tool spacings around the fault event. Short-spacing (e.g., 1 ft. to 50 ft.) reading tools may be utilized.

In certain formations where oil and gas projects are undertaken, geological faults may constitute a series of major technical challenges including well placement, reservoir simulation, reserve estimation, production, geomechanics, drilling, and more.

Certain deep directional resistivity (DDR) tools enables drillers to navigate with respect to boundaries (e.g., boundaries that are parallel to the longitudinal axis of the wellbore) up to over 100 feet away (e.g., measured perpendicular to the longitudinal axis of the wellbore) from the wellbore. Methods and apparatuses in this disclosure may be used to create a formation model to accurately image faults using (e.g., DDR) data. In one aspect, the fault position and dip were included in a formation model along with layering near the fault using a sequence of 1-D and 2-D model-based parametric inversions, gradually increasing the model complexity, shallow-to-deep, relying on knowledge of measurement sensitivities, and/or algorithm efficiency. The model parameterization may allow inverting fault and boundaries geometry and formation resistivities. In one aspect, resistivity data (e.g., field signals) may be generated by an array propagation resistivity tool, with added tilted and transverse antennae generating signals at multiple frequencies with azimuthal sensitivity up to 20 ft. deep into the formation around the tool. In another aspect, resistivity data (e.g., field signals) may be generated by a modular resistivity tool, e.g., to allow the (multiple) transmitter and receiver modules (subs) to be placed on the bottom-hole assembly (BHA) based on the depth (e.g., depth laterally into a formation from a wellbore) of investigation and/or specific scenario. The transmitter-receiver distance and increased number of appropriately chosen operating frequencies, e.g., over a wide bandwidth starting in the kHz range, may directly govern the depth of investigation. In one aspect, a resistivity tool may have depth of investigation of at least 100 feet into the formation. In one aspect, "deep directional resistivity" may refer to a depth of investigation of at least about 20, 50, 100, or 200 feet. In one aspect, "deep directional resistivity" may refer to a depth of investigation of at about 20 to 100 feet. In one aspect, "shallow directional resistivity" may refer to a depth of investigation of about or at least 2, 5, 10, 15, 20 feet. In one aspect, "shallow directional resistivity" may refer to a depth of investigation of about 2 to 15 feet. Both "shallow" and "deep" directional electromagnetic tools may record hundreds of measurements of different types (e.g., field signals) with different sensitivities.

Figure 2A:
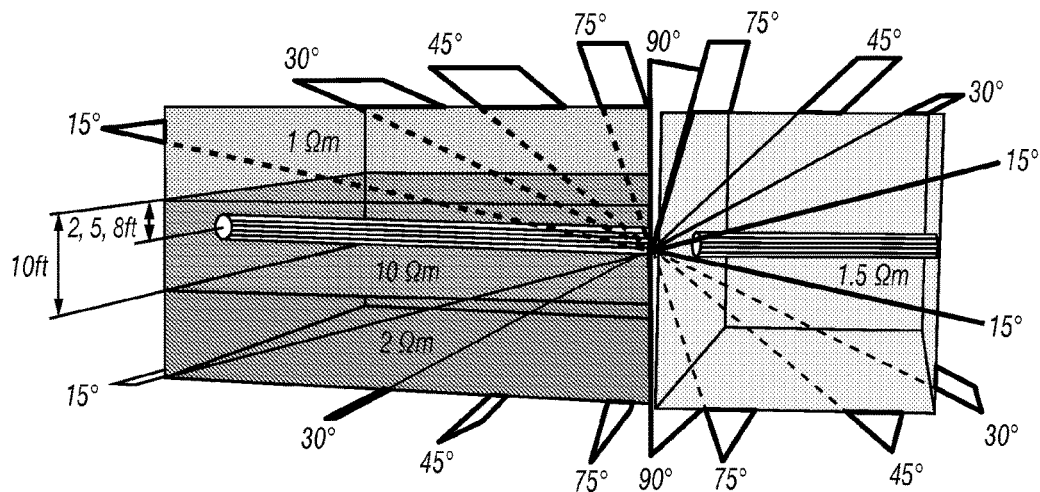
FIG. 2A illustrates an aspect of a two-dimensional fault model.
Figure 2B:
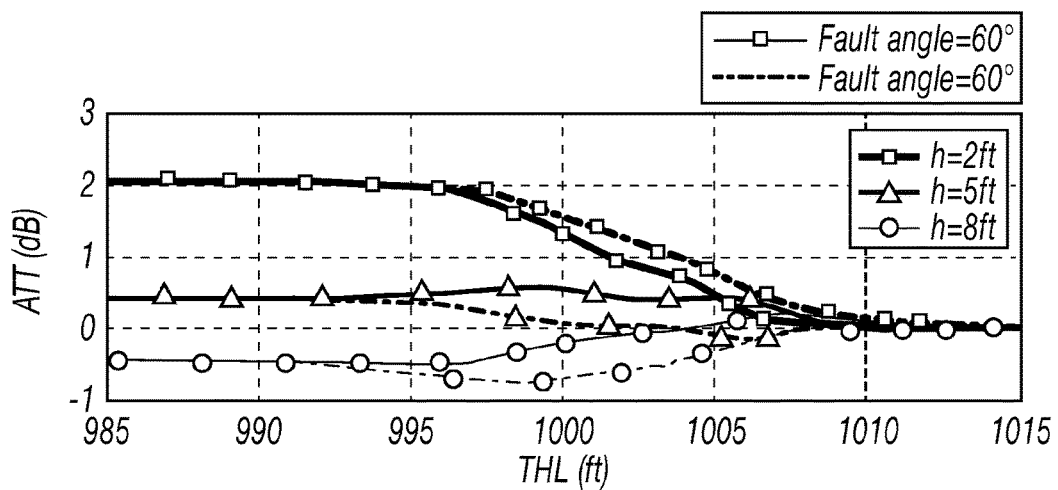
FIGS. 2B-2C illustrate the associated effects on the logging tool response for variations of parameters for the fault model of FIG. 2A.
Figure 2C:
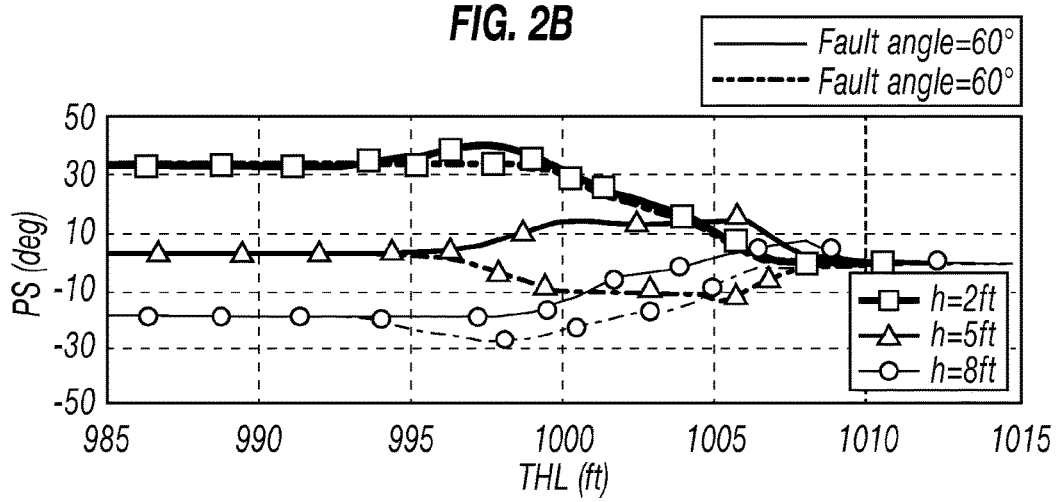

FIG. 2A illustrates an aspect of a two-dimensional fault model. Particularly, FIG. 2A illustrates a fault model (e.g., in a modeling environment) with layering in the first block. The log response of a directional resistivity tool (e.g., with 8 feet of spacing between a transmitter and a receiver) in variations of this scenario is plotted in FIGS. 2B and 2C. Three vertical positions (h) with respect to the depth to the boundary and two fault dip angles (−60° and 60°) are depicted. Particularly, FIG. 2B illustrates the associated effects on the attenuation (ATT) in decibels (dB) for variations of parameters for the fault model of FIG. 2A. FIG. 2C illustrates the associated effects on the phase-shift (PS) in degrees (deg) for variations of parameters for the fault model of FIG. 2A. The horizontal axes for FIGS. 2A and 2B are the true horizontal length (THL) in feet (ft.).

FIGS. 3A-3D illustrate aspects of distortions caused by a two-dimensional fault event on a one-dimensional inversion of resistivity data. Particularly, FIGS. 3A-3D illustrate the impact of trying to image (e.g., in a formation model) a crossed fault with a 1-D inversion for fault dip angles of 60°, 15°, −60°, and −15°. Although many aspects of this disclosure are depicted graphically, it should be understood that a formation model may be the numerical or other representation and is not limited to a graphical representation. In the aspects of FIGS. 3A-3D, the inversion results are distorted by the fault, e.g., approximately one tool spacing before and after the fault crossed at 1,000 ft. true horizontal length (THL) in the 60° cases. The distortion of the fault extends over the longer distance for the 15° cases, e.g., due to "look-around" sensitivity because the fault is nearly horizontal and may be mapped as a boundary once the logging tool completely crosses it.

Figure 4:
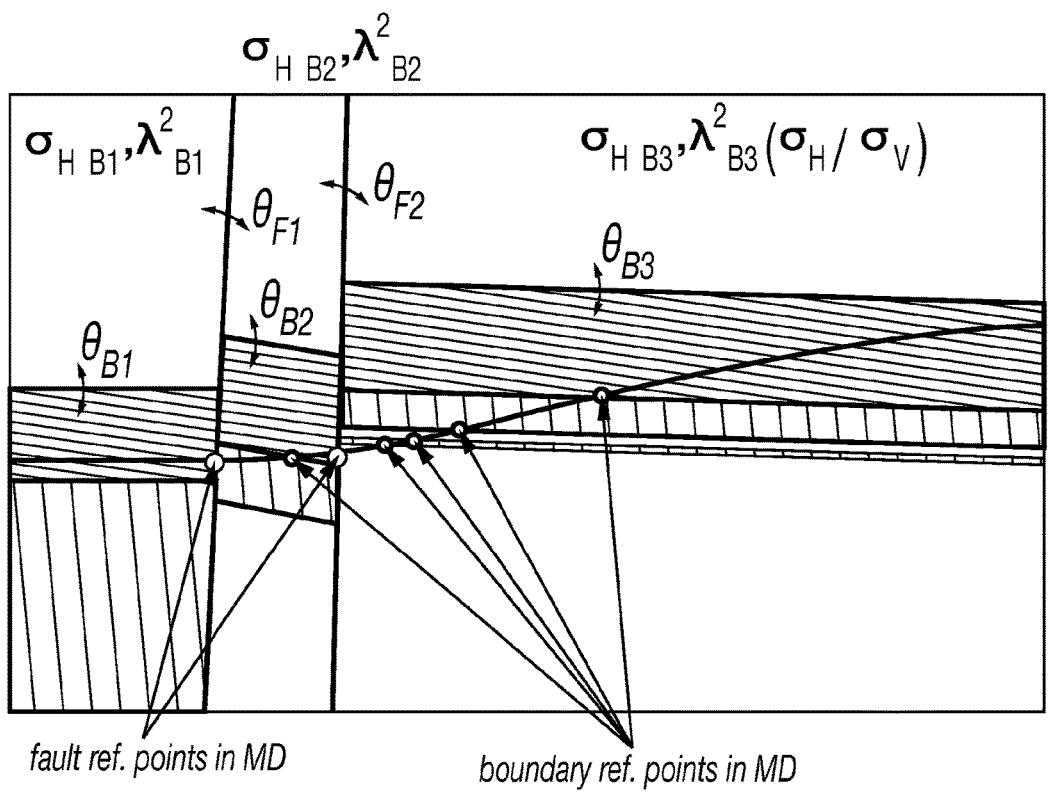
FIG. 4 illustrates an aspect of a model parameterization used in two-dimensional modeling and inversion.

As noted above, methods and apparatuses of this disclosure may use (e.g., derivatives of) a stochastic inversion, Monte Carlo, Gauss-Newton, or other optimization scheme to guide the inversion. The optimization scheme may be generalized to include constraints, with a regularization term and weighting based on the data. The optimization scheme may be independent of the model parameterization scheme. A model parameterization scheme is shown in FIG. 4. In one aspect, this disclosure may use stochastic optimization schemes or derivative-free optimization schemes (e.g., particle swarm, differential evolution, adaptive mesh, and/or pattern searches).

FIG. 4 illustrates an aspect of a model parameterization used in two-dimensional modeling and inversion. Depicted faulted formation includes layering blocks separated by faults. Each layering block i may have a multilayer 1-D structure with arbitrary common dip angle ($\theta_{Bi}$), layer resistivities (vectors of horizontal conductivities $\sigma_{H\_Bi}$), and anisotropy (vectors $\lambda Bi$). If crossed, the boundary positions may be defined with respect to the trajectory or with vertical coordinates. Similarly, a fault may be defined by the trajectory crossing point position and its dip angle. MD may generally refer to measured depth.

In one aspect, to use a two-dimensional (2-D) inversion, a common model description and parameterization and smooth integration between 1-D multi-layer, 2-D, and ultimately 3-D inversions may be utilized. In one aspect, the model definition may be compatible with reservoir-scale modeling platforms and wellbore-centric interpretation platforms, e.g., to allow an exchange of models, achieve integration of the logging (e.g., LWD) data into the reservoir models, and/or in 3-D reservoir characterization. A one-dimensional (1-D) inversion may be a station-by-station one-dimensional inversion.

In one aspect, certain methods and apparatuses of this disclosure generate a formation model that includes fault scenarios based on a series of inversions and processing methods taking advantage of the available directional measurement sensitivities to extract specific features such as the formation layering, resistivities, the remote boundaries, and/or the position and dip of the crossed fault plane itself. In one aspect, user inputs are not included at the start, for example, the formation model complexity may be increased from 1-D to 2-D as the workflow progresses, e.g., allowing integration of data of different scales. The inversions may provide quality control to ensure that the intermediate results in generating the formation model are geologically likely.

In one aspect, the formation model generation includes a series of refinements to the formation model, e.g., from shallower to deeper, to increase the complexity from the 1-D level to the 2-D level. In one aspect, formation model generation may include not inverting all parameters of a 2-D model simultaneously. In one aspect, the formation model generation includes a series of refinements to the formation model, for example, from shallower to deeper, e.g., to stabilize the overall inversion process because it is based on measurement sensitivities to reduce ambiguity in the formation model.

For example, a fault (e.g., fault zone) may exhibit a wide range of geometrical configurations, e.g., from simple planar faults to chaotic fracturing and secondary faulting near major faults. In one aspect, the apparatuses and methods of this disclosure identify (e.g., plausible) simplified scenarios to model the response of the tools around the fault zone, for example, in intervals where layered-model inversions do not converge and the possibility of faulting is recognized.

Figure 5:
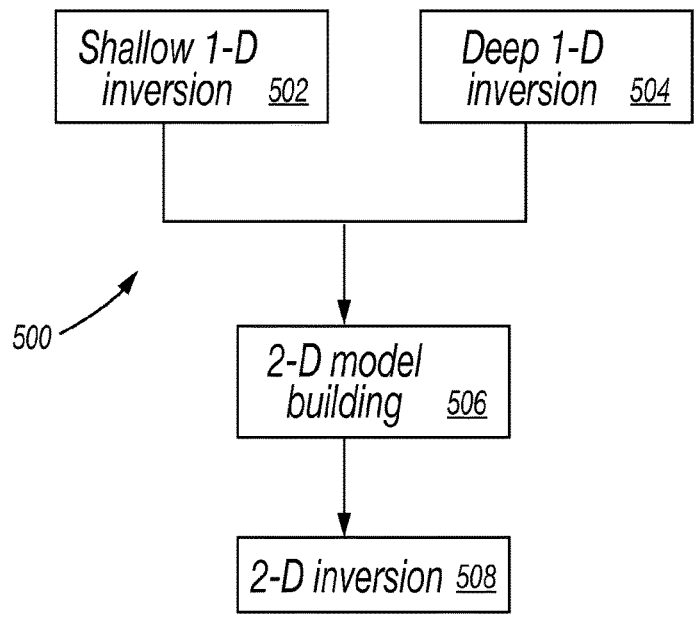
FIG. 5 illustrates an aspect of a flow diagram to generate a two-dimensional formation model.
Figure 6:
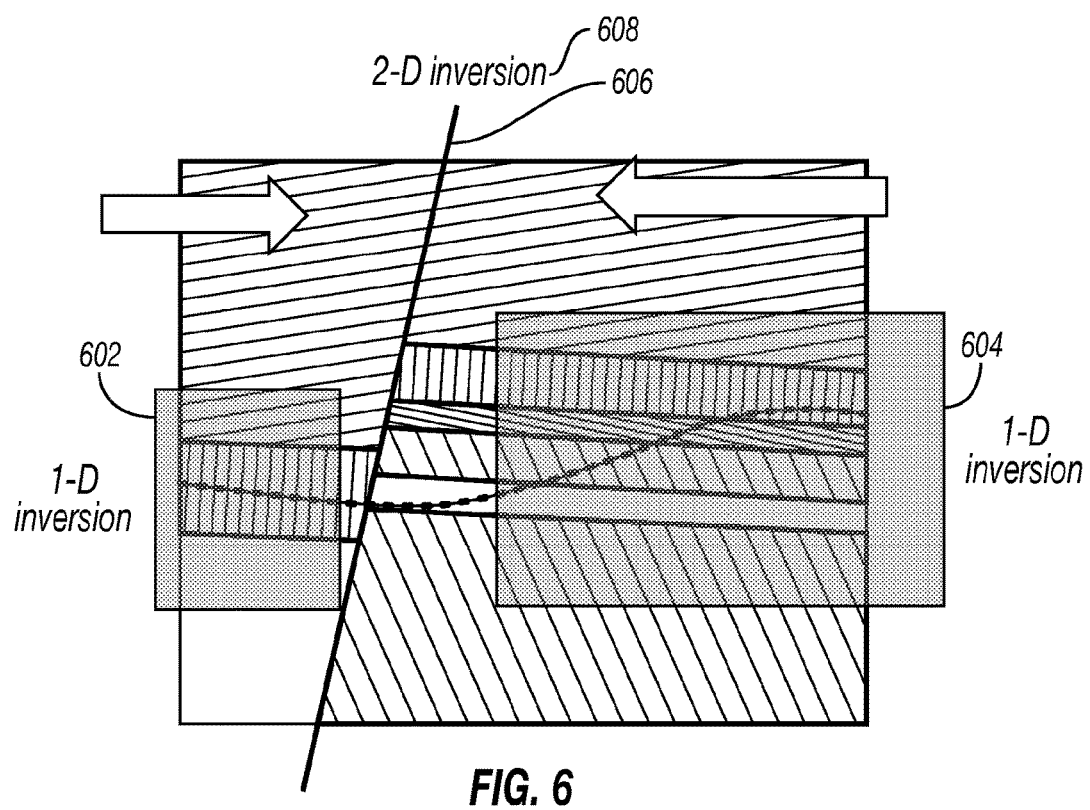
FIG. 6 illustrates an aspect of a graphical illustration of the flow diagram of FIG. 5.

FIG. 5 illustrates an aspect of a flow diagram 500 to generate a two-dimensional formation model. FIG. 6 illustrates an aspect of a graphical illustration of the flow diagram of FIG. 5. Flow diagram may be utilized by a modeling unit or modeling method. First, a set of data (e.g., electromagnetic field signals induced in a formation) is provided. In one aspect, an interval of the formation where the possibility (e.g., a selected probability) of a fault exists is selected. For example, the possibility (e.g., a selected probability) of a fault existing in a data set for an interval of a formation may be indicated by a distortion (e.g., misfit) of a 1-D inversion or other log (e.g., a gamma ray log or in image log). Although the terms "shallow" and "deep" are utilized, this disclosure is not so limited and any two sets of (e.g., resistivity) data may be used, for example, a first set of (e.g., resistivity) data and a second set of (e.g., resistivity) data from a deeper (e.g., laterally deeper from the longitudinal axis of the wellbore into the formation) depth of investigation.

A 1-D inversion 502 of a set of shallow data (e.g., field signals) may be performed, for example, as discussed herein. A 1-D inversion 504 of a set of deep data (e.g., field signals) may be performed, for example, as discussed herein. Inversions 502 and 504 may occur simultaneously. Two or more inversion on separate data sets may be utilized. A 2-D model may then be built 506 from a combination of the inversions (502, 504), for example, as discussed herein. One aspect of building a 2-D model is discussed in reference to FIGS. 8A-8D. A 2-D inversion 508 may then be performed on the 2-D model to generate a formation model, e.g., a formation model that includes a fault.

As one example, from an interval of data where the possibility of fault exists, a station by station (e.g., real-time) 1-D inversion is performed for a low number of layers, for example 3 to 6. In one aspect, this 1-D inversion is performed on the data (e.g., field signals) from a deeper depth of investigation of two or more data sets, e.g., from the "deep" data set. In one example, this 1-D inversion is performed on data (e.g., field signals) blocks that are on each side(s) of the fault, for example, blocks 602 and 604 adjacent to fault 606 in FIG. 6. In one aspect, the 1-D inversion excludes the data (e.g., field signals) blocks that intersect and/or are directly adjacent to the fault (e.g., within about 1, 2, 3, 4, 5, 6, 7, 8, 9, 10, or 20 tool spacings). The fault position may then be estimated, e.g., along the wellbore. In one aspect, the estimated fault position may be where the distortion (e.g., misfit) from a 1-D inversion is highest. In one aspect, the estimated fault position may be found on a LWD log (e.g., as a distortion in the expected data).

In one aspect, the (e.g., initial) 2-D model (e.g., in model building 506) may include (e.g., capture) the block structure in both blocks (e.g., 602 and 604 in FIG. 6). For example, in each block, the dip may be averaged, the layers may be identified, and/or the resistivities (e.g., horizontal ($R_h$) and vertical ($R_v$)) may be averaged for each layer, for example, to take into account the uncertainty from the 1-D inversions.

The (e.g., initial) 2-D model (e.g., from model building 506) may then undergo a 2-D inversion. For example, the 2-D model may invert for the fault position along the wellbore and its apparent dip angle (e.g., in degrees). In one aspect, a plurality of starting points for the fault angle may be used for this inversion (e.g., zero or vertical, a positive, and a negative value). For example, in FIG. 6, the 2-D inversion may be performed on the data (e.g., "shallow" data) intersected by the fault as indicated by the inwardly facing arrows in FIG. 6.

Figure 7:
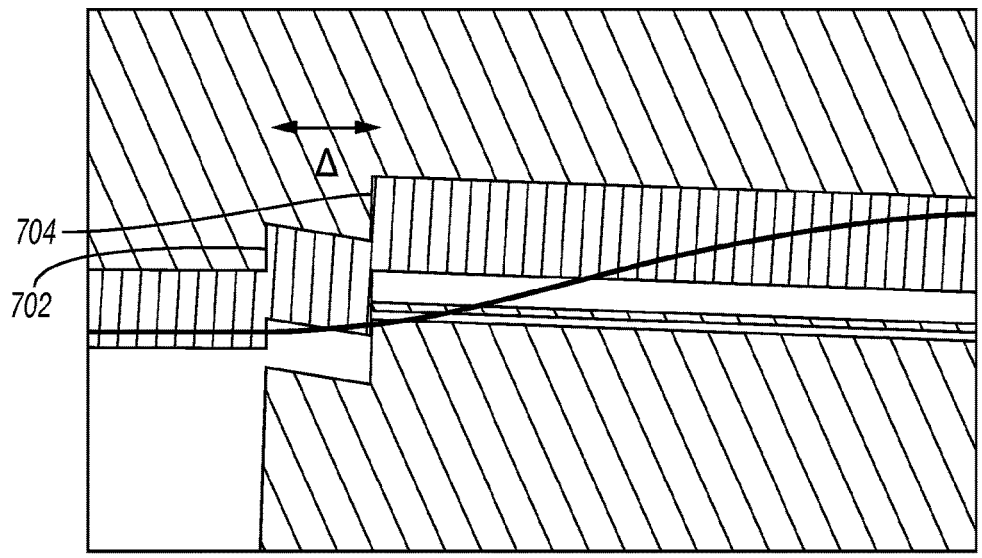
FIG. 7 illustrates an aspect of a fault zone with multiple faults separated by a distance A.

As another example, inversions (e.g., 502, 504) may be performed in a sequence of a first 1-D inversion of a first set (e.g., of conventional or "shallow") directional data (e.g., with the depth of investigation of about 5 to 20 feet) and then a second 1-D inversion of a second set (e.g., of "deep") directional data (e.g., with the depth of investigation of greater than about 20 to 100 feet). The 1-D inversion results may then used to build a 2-D model (e.g., in 506) by identifying the fault zone and extracting the model on two sides of the fault. The 1-D layered models may then be propagated assuming constant formation dip at two sides of the fault. Then, an estimate of the fault position and dip may be made to build an initial 2-D model (e.g., in 506), and a 2-D inversion may then be used (e.g., in 508) to adjust the position of the fault, for example, in measured depth (MD) and the fault angle. A 2-D inversion may decouple the layering and fault effect to solve for an accurate position and orientation of the fault consistent with the (e.g., directional resistivity) data. FIG. 7 illustrates an aspect of a fault zone with multiple faults (702,704) separated by a distance A. The workflows herein may be used when multiple faults are present, e.g., faults separated by a distance shorter than the tool spacing. For example, the workflows may include as a variable the number of faults in the data set, e.g., in the formation.

FIG. 8A illustrates an aspect of the graphical results of a one-dimensional inversion. In one aspect, this one-dimensional inversion is a combination of the "shallow" and "deep" inversions (e.g., 502 and 504 in FIG. 5), for example, such that the fault zone is indicated as a distortion (e.g., inconsistencies). FIG. 8B illustrates an aspect of the graphical results of a distortion in distortion in the one-dimensional inversion of FIG. 8A which indicate the presence of a fault (e.g., presence of a non 1-D formation). In one aspect, the distortion is determined by calculating for each input (e.g., input data) the total squared difference between the input (e.g., input data) and its respective reconstructed version. In one aspect, the distortion data is normalized. In FIG. 8A, the overall distortion (e.g., misfit) is shown on the plot with the contribution from each channel. FIG. 8C illustrates an aspect of a two-dimensional model built from the one-dimensional inversion of FIG. 8A. Depicted 2-D model includes three layers separated by a fault 802C from a fourth layer. In one aspect, 2-D model building (e.g., 506 in FIG. 5) may include placing a fault in the 2-D model. In one example, the fault is placed in the 2-D model in the zone of high distortion (e.g., misfit) from the one-dimensional inversion. In one example, the fault is placed in the 2-D model to be orthogonal to the layers (e.g., orthogonal the longitudinal plane of each layers). FIG. 8D illustrates an aspect of a two-dimensional formation model generated from the two-dimensional inversion of the two-dimensional model in FIG. 8C. In one aspect, the 2-D inversion of the model in FIG. 8C may allow the fault 802D to be titled (e.g., skewed) to the appropriate angle such that the (e.g., field signal) data fits the final formation model in FIG. 8D.

Figure 9:
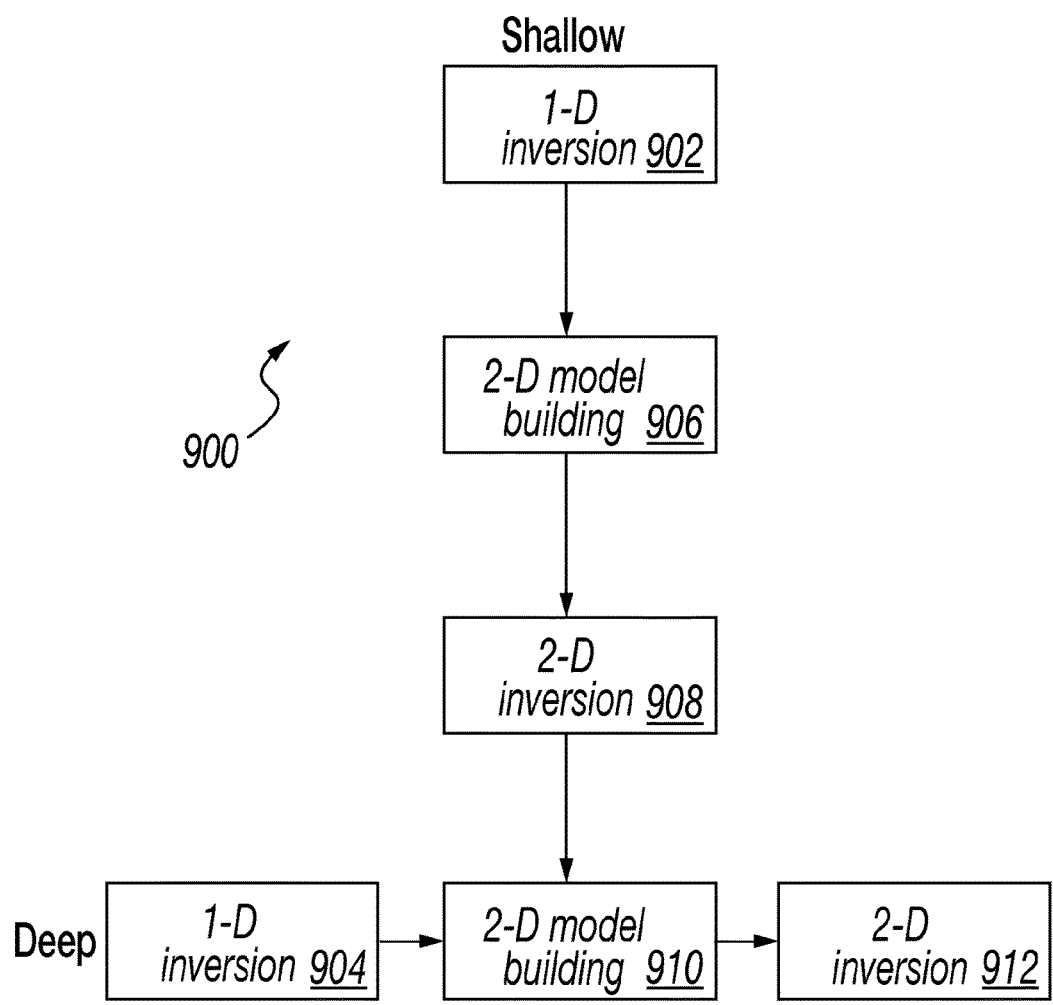
FIG. 9 illustrates another aspect of a flow diagram to generate a two-dimensional formation model.

FIG. 9 illustrates another aspect of a flow diagram to generate a two-dimensional formation model. Flow diagram may be utilized by a modeling unit or modeling method. First, a set of data (e.g., electromagnetic field signals induced in a formation) is provided. In one aspect, an interval of the formation where the possibility (e.g., a selected probability) of a fault exists is selected. For example, the possibility (e.g., a selected probability) of a fault existing in a data set for an interval of a formation may be indicated by a distortion (e.g., misfit) of a 1-D inversion or other log (e.g., a gamma ray log or in image log). Although the terms "shallow" and "deep" are utilized, this disclosure is not so limited and any two sets of (e.g., resistivity) data may be used, for example, a first set of (e.g., resistivity) data and a second set of (e.g., resistivity) data from a deeper (e.g., laterally deeper from the longitudinal axis of the wellbore into the formation) depth of investigation.

A 1-D inversion 904 of a set of deep data (e.g., field signals) may be performed, for example, as discussed herein. A 1-D inversion 902 of a set of shallow data (e.g., field signals) may be performed, for example, as discussed herein. Inversions 902 and 904 may occur simultaneously. Two or more inversion on separate data sets may be utilized.

After the first inversion 902 on the shallow data, a 2-D model may be built from that first inversion 902 (e.g., without the data from the first inversion of the deep data 904). That 2-D model may then be inverted 908. The results of that 2-D inversion (in 908) may then be combined with the data from 1-D inversion 904 of the deep data to build a second 2-D model 910. A second 2-D inversion 912 may then be performed on the second 2-D model (from 910) to produce a 2-D formation model, e.g., a formation model that includes a fault.

In certain aspects, the flow diagram in FIG. 9 may be utilized to handle fault scenarios where DDR responses are affected over a wider zone and (e.g., automatic) inversion at different scales are not consistent because of local variation of layering dip near the fault (e.g., caused by fault drag).

One such application to a field data set is discussed in reference to FIGS. 10A-10C and 11A-11F below. Particularly, FIGS. 10A-10C and 11A-11F illustrate graphical representations of using the advanced workflow from FIG. 9 on data that includes directional resistivity and deep directional data sets.

FIG. 10A illustrates an aspect of the graphical results of a one-dimensional inversion. FIG. 10B illustrates an aspect of a two-dimensional model built from the one-dimensional inversion of FIG. 10A. FIG. 10C illustrates an aspect of a two-dimensional formation model generated from the two-dimensional inversion of the two-dimensional model in FIG. 10B.

Figure 11E:
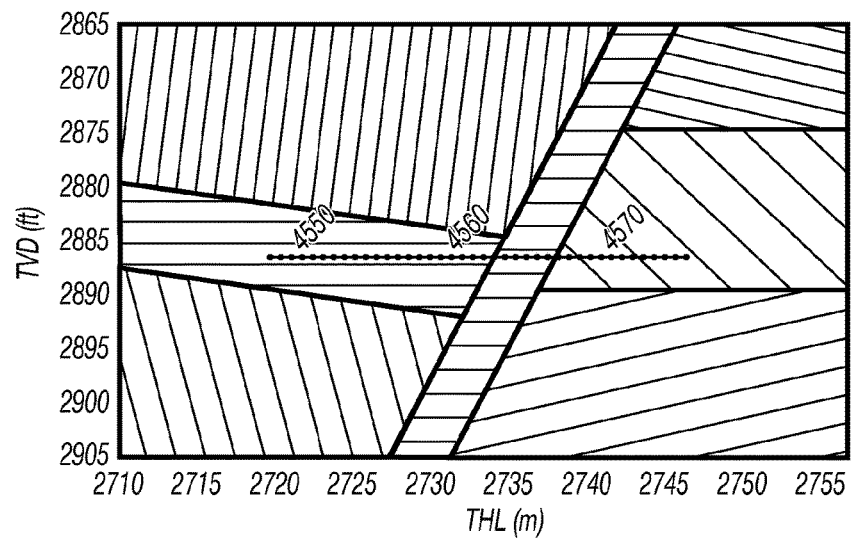
FIG. 11E illustrates an aspect of a two-dimensional model built from the two-dimensional inversion in FIG. 11C and the one-dimensional inversion in FIG. 11B.
Figure 11F:
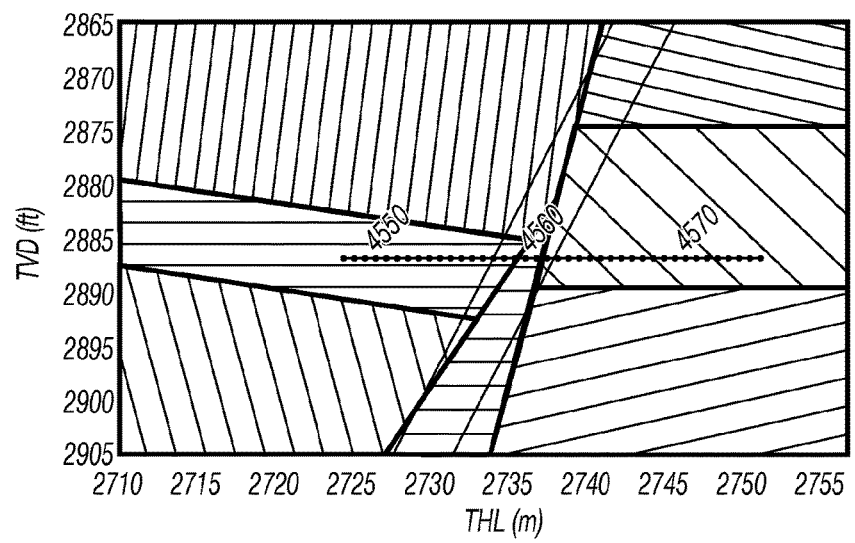
FIG. 11F illustrates an aspect of a two-dimensional formation model generated from the two-dimensional inversion of the two-dimensional model in FIG. 11E.

FIG. 11A illustrates an aspect of the graphical results of a one-dimensional inversion. FIG. 11B illustrates an aspect of the graphical results of the extraction of boundaries from locally one-dimensional results away from the fault zone. FIG. 11C illustrates an aspect of a two-dimensional model built from a shallow one-dimensional inversion. FIG. 11D illustrates an aspect of a two-dimensional model built from a deep one-dimensional inversion and a shallow two-dimensional inversion. FIG. 11E illustrates an aspect of a two-dimensional model built from the two-dimensional inversion in FIG. 11C and the one-dimensional inversion in FIG. 11B. FIG. 11F illustrates an aspect of a two-dimensional formation model generated from the two-dimensional inversion of the two-dimensional model in FIG. 11E.

FIGS. 10A-10C show a real-time interpretation based on 1-D inversion of directional resistivity measurements. In one aspect, six channels of a logging tool are used, e.g., two resistivities (P28H, e.g., 28 inches of spacing at 2 MHz, and P40H, e.g., 40 inches of spacing at 2 MHz) and four symmetrized directional channels (96 inches of spacing at the two frequencies—SAD1 (symmetrized attenuation measurement at 100 kHz), SAD4 (symmetrized attenuation measurement at 400 kHz), SPD1 (symmetrized phase-shift measurement at 100 kHz), and SPD4 (symmetrized phase-shift measurement at 400 kHz)), processing a 10 ft. (e.g., width) data sliding window in the inversion. In the zone where the 1-D inversion has a distortion (e.g., is not consistent), a 2-D model with two parallel (e.g., and orthogonal) faults (1002,1004) (e.g., high angle features) is built while the layer boundaries are extracted away from the fault zone, e.g., as shown in FIG. 10B. A 2-D inversion may then be run to estimate the position and angle of the two faults (1002, 1004) using a 20 ft. (e.g., width) data window. The 1-D inversion of deep directional data is shown in FIG. 11A. Two spacings of 60 ft. and 70 ft. may be used, e.g., with three frequencies each. Compared to the results of the 1-D inversion of directional resistivity, the distortion (e.g., inconsistent zone) may be wider due to longer DDR spacings. The 2-D inversion results of the deep directional resistivity may be affected within a small (e.g., within 20 ft.) interval around the fault zone. The use of a two-fault model to invert the deep directional data alone may not be sufficient to reconstruct the data (e.g., in the formation model). A single fault model including fault drag may be utilized. The boundary shape on the left hand side of the fault may be constructed by merging the boundary from the 1-D inversion results (e.g., in FIG. 11B) and the directional resistivity derived model, for example, the left hand side boundary and fault, e.g., in FIG. 11C. The formation (e.g., merged) model is displayed in FIG. 11D. The upper boundary may be assumed parallel to the lower boundary in an (e.g., initial) model. A (e.g., second) 2-D inversion may then be performed to determine the position and the dip (angle) of both faults. The initial 2-D model (e.g., from 910 in FIG. 9) built by the 2-D inversion on the two faults may be seen in FIG. 11E, for example, the angles and positions of each fault (e.g., illustrated as two parallel lines) may be modified. In one aspect, the initial fault angle(s) and position(s) may be taken from the shallow scale 2-D inversion (e.g., from 908 in FIG. 9). The (e.g., final) 2-D formation model obtained by combining the 1-D and 2-D inversions may be seen in FIG. 11F, e.g., indicating the faults are not parallel, but instead pinch out toward the right (as viewed). The original parallel lines are also visible in FIG. 11F for illustrative purposes.

In one aspect, model consistency, positive match of the formation model to the data set from the formation (e.g., field signals), and reconstruction of directional data from the formation model may be indicators of interpretation quality (for example, variables used in the minimization of error to produce a fit of the model and the data set), e.g., such the resulting formation model with fault(s) is an adequate representation of the reservoir geometry. In one aspect, a formation model produced by the apparatus and methods of this disclosure may accurately model a formation with a fault(s) and non 1-D layered geometries.

In the aspects in FIGS. 12A-12H, the utilization of the workflow in FIG. 5 is discussed. In this example, data channels from a logging tool that may be available in real-time were utilized, e.g., two resistivity channels (A34H, e.g., 2 MHz at 34 in. spacing and P28H, e.g., 2 MHz at 28 in. spacing) and six symmetrized directional channels at 8 ft. spacing and frequencies of 100 kHz and 400 kHz. DDR data with spacings of 25 ft. and 35 ft. were taken at three frequencies each, including symmetrized directional, harmonic resistivity, and harmonic anisotropy channels.

Figure 12A:
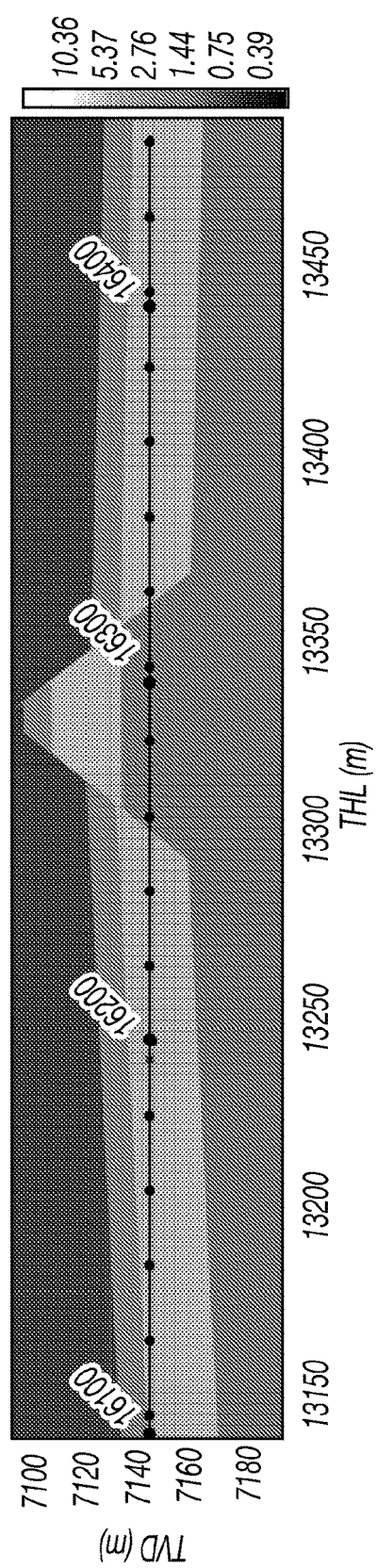
FIG. 12A illustrates an aspect of a formation data set with a horst and two normal faults and a four layer structure.
Figure 12B:
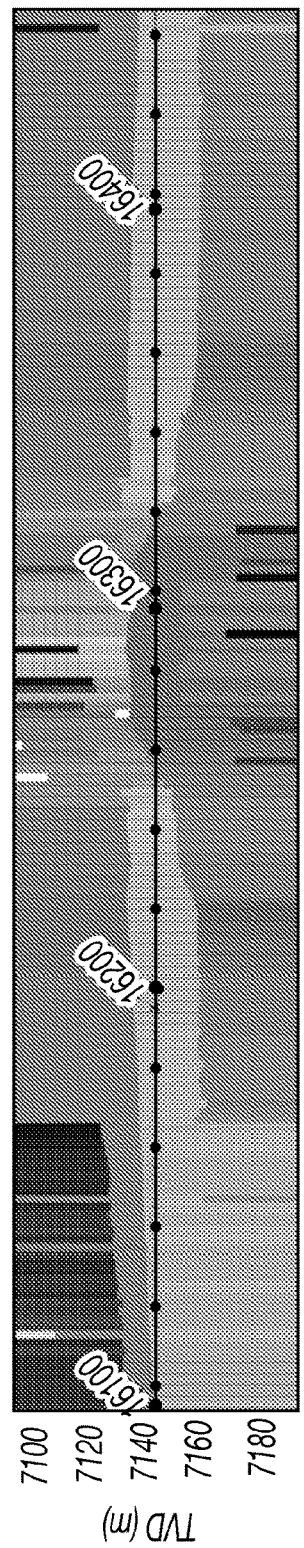
FIG. 12B illustrates an aspect of the graphical results of a one-dimensional inversion.

The evolution (e.g., refinement) of a model for the formation in FIG. 12A through a processing sequence may be seen in FIGS. 12B-12H: from joint 1-D inversion of two (e.g., shallow and deep) data sets in FIG. 12B, measurement reconstructions from the model are shown in FIGS. 12C-12F, a corresponding derived 2-D initial model in the identified fault zone in FIG. 12G, and the final formation model in FIG. 12H formed from the 2-D inversion results and final interpretation combining the 1-D and 2-D inversion results.

Figure 12C:
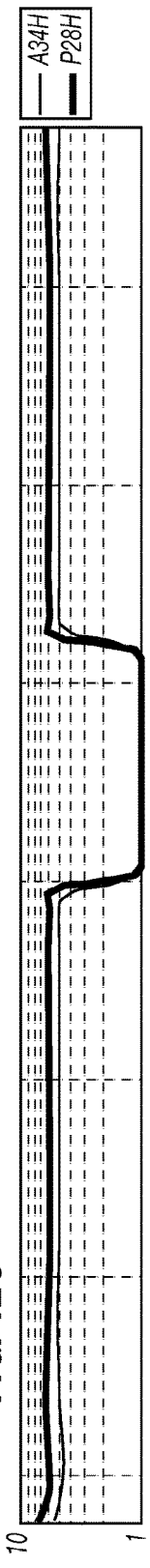
FIG. 12C illustrates an aspect of the graphical results of a one-dimensional inversion response reconstruction of resistivity.
Figure 12D:
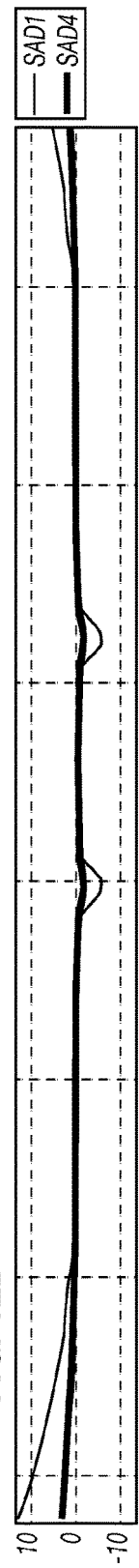
FIG. 12D illustrates an aspect of the graphical results of symmetrized directional attenuations.
Figure 12E:
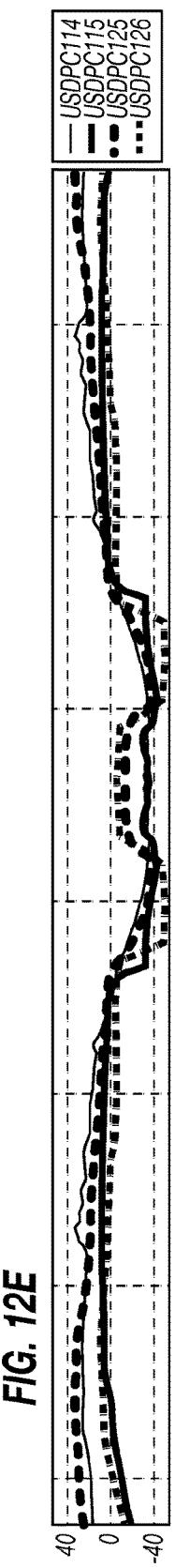
FIG. 12E illustrates an aspect of the graphical results of symmetrized directional phase shifts.
Figure 12F:
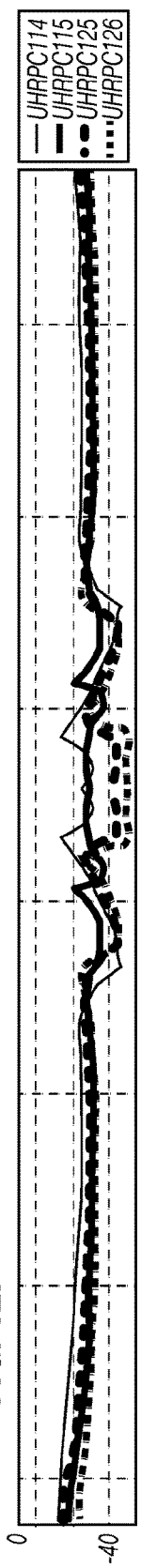
FIG. 12F illustrates an aspect of the graphical results of harmonic resistivity phase shifts.

FIG. 12A illustrates an example of a formation data set with a horst and two normal faults and a four layer structure. FIG. 12B illustrates an aspect of the graphical results of a one-dimensional inversion. Although a one-dimensional inversion is mentioned herein, a one-dimensional inversion may include the combination of a plurality of one-dimensional inversions, see, for example, FIG. 5. FIG. 12C illustrates an aspect of the graphical results of a one-dimensional inversion response reconstruction of resistivity. FIG. 12D illustrates an aspect of the graphical results of symmetrized directional attenuations. FIG. 12E illustrates an aspect of the graphical results of symmetrized directional phase shifts. FIG. 12F illustrates an aspect of the graphical results of harmonic resistivity phase shifts. Each or any combination of the data in FIGS. 12B-12G may indicate a fault (e.g., a distortion in the inversion results and poor reconstruction of the data set). FIG. 12G illustrates an aspect of a two-dimensional model built from a deep one-dimensional inversion and a shallow one-dimensional inversion, see also, e.g., FIG. 5. FIG. 12H illustrates an aspect of a two-dimensional formation model generated from the two-dimensional inversion of the two-dimensional model in FIG. 12G integrated with the model built from station-by-station one-dimensional inversion with an acceptable level of data reconstruction, see also, e.g., FIG. 5.

FIGS. 13A-13K illustrate a single fault example with six-layer structures on both sides of the fault. In one aspect, certain channels of a logging tool are used, e.g., two resistivity channels (A40H and P28H), six directional resistivity channels, and DDR data from spacings of 25 ft. and 35 ft.

The evolution (e.g., refinement) of a model for the formation in FIG. 13A through a processing sequence may be seen in FIGS. 13B-13K: from joint 1-D inversion of two data sets (e.g., shallow and deep data) in FIG. 13B, for example, using a number of layers less than the complexity present in the actual formation), measurement reconstructions from the model are shown in FIGS. 13C-13G, distortion (e.g., inversion misfit) in FIG. 13H, estimated dip in FIG. 13I, a corresponding derived 2-D initial model in the identified fault zone in FIG. 13J, and the final formation model in FIG. 13K formed from the 2-D inversion results and final interpretation combining the 1-D and 2-D inversion results. In one aspect, a distortion in the model indicates that the model is an inconsistent interpretation of the fault zone. After a 2-D inversion is applied, the responses may be well reconstructed and the 1-D and 2-D inversion results in the simple layered zone and in the fault zone may be consistent.

FIG. 13A illustrates an aspect of a formation data set with a fault and a six layer structure on each side of the fault. FIG. 13B illustrates an aspect of the graphical results of a one-dimensional inversion. FIG. 13C illustrates an aspect of the graphical results of a one-dimensional inversion response reconstruction of resistivity. FIG. 13D illustrates an aspect of the graphical results of symmetrized directional attenuations. FIG. 13E illustrates an aspect of the graphical results of symmetrized directional phase shifts. FIG. 13F illustrates an aspect of the graphical results of symmetrized directional attenuations. FIG. 13G illustrates an aspect of the graphical results of harmonic resistivity attenuations. FIG. 13H illustrates an aspect of the graphical results of a distortion (e.g., inversion misfit). FIG. 13I illustrates an aspect of the graphical results of an estimated dip. FIG. 13J illustrates an aspect of a two-dimensional model built from a deep one-dimensional inversion and a shallow one-dimensional inversion. FIG. 13K illustrates an aspect of a two-dimensional formation model generated from the two-dimensional inversion of the two-dimensional model in FIG. 13J.

FIGS. 14A-16D illustrate the workflow of FIG. 5 applied to a directional resistivity data set. FIGS. 14B-14G illustrate a (e.g., real-time) interpretation based on 1-D inversion along with the nuclear density image and the response reconstruction. In one aspect, certain channels of a logging tool are used, e.g., two resistivity channels (A40H and P40H) and six symmetrized directional channels (96-in. spacing at three frequencies—SAD1, SAD4, SAD2, SPD1, SPD4, and SPD2) from the directional resistivity tool, and using a 15 ft. (e.g., width) data sliding window in the inversion. Two zones with a distortion (e.g., undesirable measurement reconstruction and/or non 1-D signature) corresponding to a fault may be identified and re-processed using the fault inversion. The boundaries may be extracted from the initial 1-D inversion, and a 2-D model generated, see, e.g., FIG. 5. A window of 20 ft. (e.g., laterally from the fault) of data around each fault may be processed to determine the position and angle of the fault(s). For the second fault inversion, the right-hand side consistent 1-D layering section may be propagated from x80 true horizontal length (THL). Formation model in FIG. 14G may be formed from the 2-D inversions (e.g., one for each fault zone) overlaid on the 1-D inversion results from FIG. 14A. Detailed results including response reconstructions and distortions (e.g., misfits) for the first fault are shown in FIGS. 15A-15I for the 1-D inversion and in FIGS. 16A-16D for the 2-D inversion, respectively.

Figure 14A:
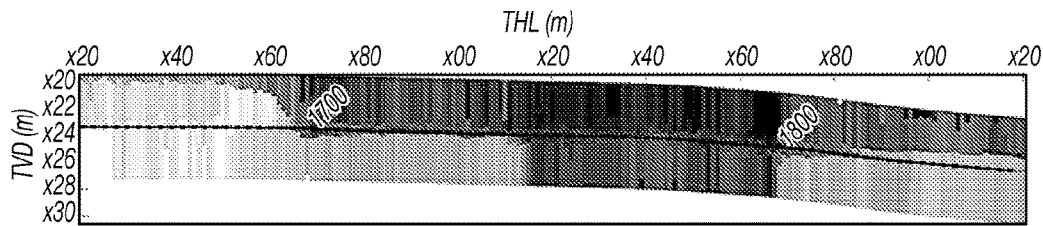
FIG. 14A illustrates an aspect of the graphical results of a station-by-station one-dimensional inversion.
Figure 14B:
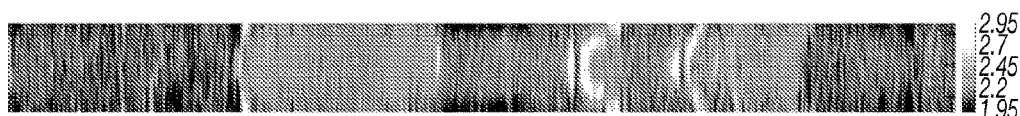
FIG. 14B illustrates an aspect of a density image.
Figure 14C:
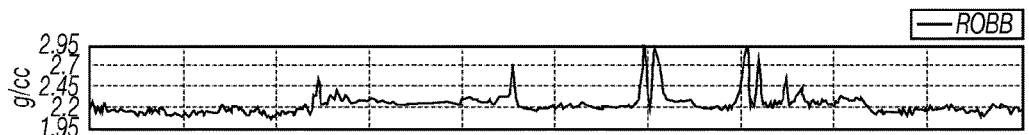
FIG. 14C illustrates an aspect of the graphical results of the bottom quadrant density.
Figure 14D:
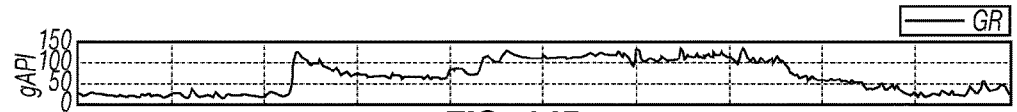
FIG. 14D illustrates an aspect of the graphical results of a gamma ray log.
Figure 14E:
FIG. 14E illustrates an aspect of the graphical results of a one-dimensional inversion response reconstruction of resistivity measurements.
Figure 14F:
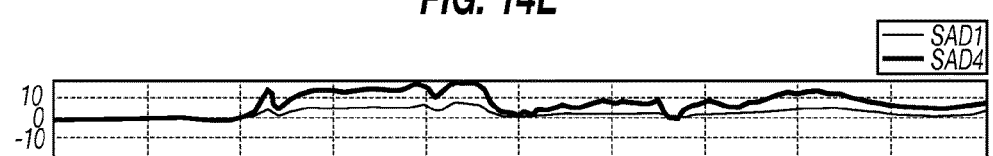
FIG. 14F illustrates an aspect of the graphical results of a one-dimensional inversion response reconstruction of symmetrized directional attenuations.
Figure 14G:
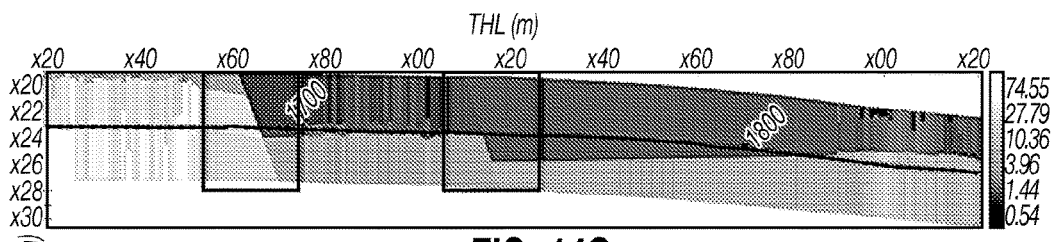
FIG. 14G illustrates an aspect of a two-dimensional formation model generated from the two-dimensional inversion of a two-dimensional model built from a deep one-dimensional inversion and a shallow one-dimensional inversion.

FIG. 14A illustrates an aspect of the graphical results of a one-dimensional inversion. FIG. 14B illustrates an aspect of a density image. FIG. 14C illustrates an aspect of the graphical results of the bottom quadrant density. FIG. 14D illustrates an aspect of the graphical results of a gamma ray log. FIG. 14E illustrates an aspect of the graphical results of a one-dimensional inversion response reconstruction of resistivity. FIG. 14F illustrates an aspect of the graphical results of symmetrized directional attenuations. FIG. 14G illustrates an aspect of a two-dimensional formation model generated from the two-dimensional inversion of a two-dimensional model built from a deep one-dimensional inversion and a shallow one-dimensional inversion.

FIG. 15A illustrates an aspect of the graphical results of a one-dimensional inversion. FIG. 15B illustrates an aspect of a density image. FIG. 15C illustrates an aspect of the graphical results of the bottom quadrant density. FIG. 15D illustrates an aspect of the graphical results of a gamma ray log. FIG. 15E illustrates an aspect of the graphical results of a one-dimensional inversion response reconstruction of resistivity. FIG. 15F illustrates an aspect of the graphical results of symmetrized directional attenuations. FIG. 15G illustrates an aspect of the graphical results of a symmetrized directional phase shifts. FIG. 15H illustrates an aspect of the graphical results of a distortion (e.g., inversion misfit). FIG. 15I illustrates an aspect of the graphical results of an estimated dip.

Figure 16A:
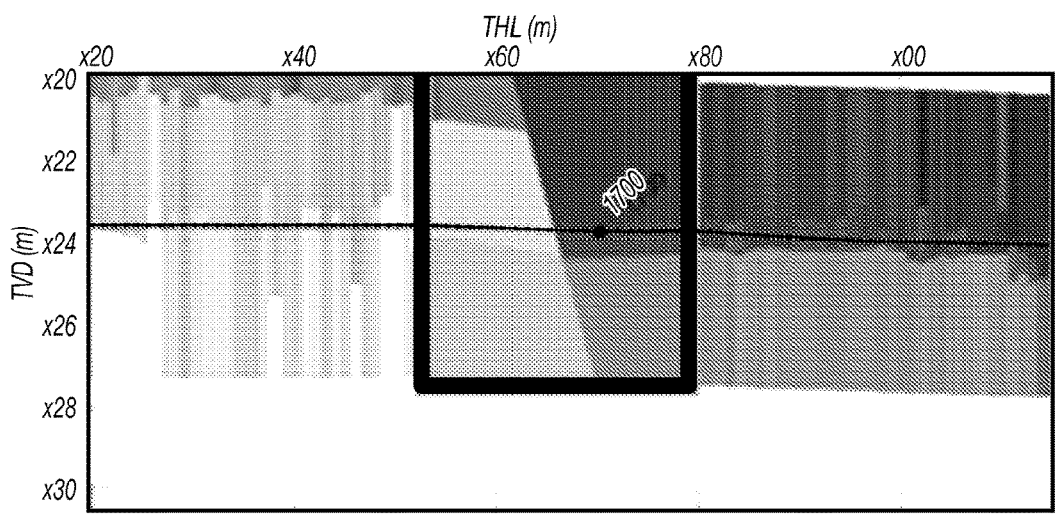
FIG. 16A illustrates an aspect of a two-dimensional formation model generated from the two-dimensional inversion of a two-dimensional model built from a station-by-station joint or sequential one-dimensional inversion of a deep and a shallow sensing data.
Figure 16B:
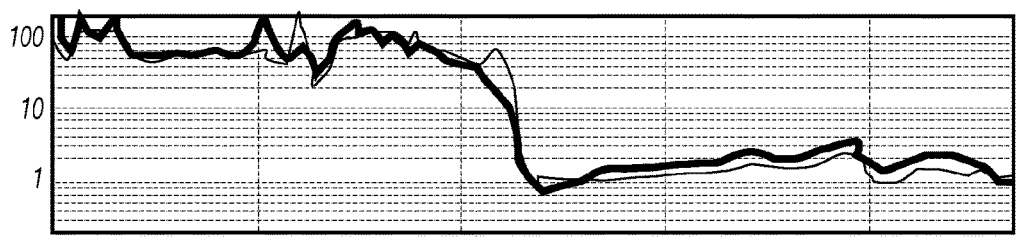
FIG. 16B illustrates an aspect of the graphical results of a two-dimensional inversion response reconstruction of resistivity measurements.
Figure 16C:
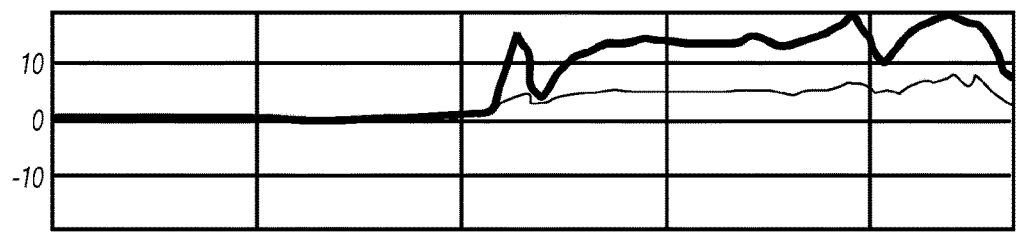
FIG. 16C illustrates an aspect of the graphical results of a one-dimensional inversion response reconstruction of symmetrized directional attenuations.
Figure 16D:
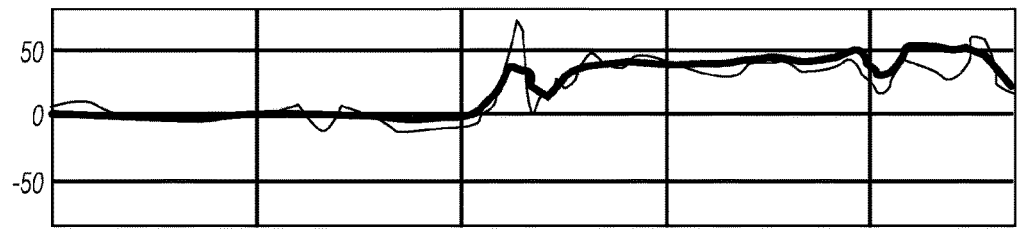
FIG. 16D illustrates an aspect of the graphical results of a one-dimensional inversion response reconstruction of a symmetrized directional phase shifts.

FIG. 16A illustrates an aspect of a two-dimensional formation model generated from the two-dimensional inversion of a two-dimensional model built from a deep one-dimensional inversion and a shallow one-dimensional inversion. FIG. 16B illustrates an aspect of the graphical results of a two-dimensional inversion response reconstruction of resistivity. FIG. 16C illustrates an aspect of the graphical results of symmetrized directional attenuations. FIG. 16D illustrates an aspect of the graphical results of a symmetrized directional phase shifts.

Figure 17A:
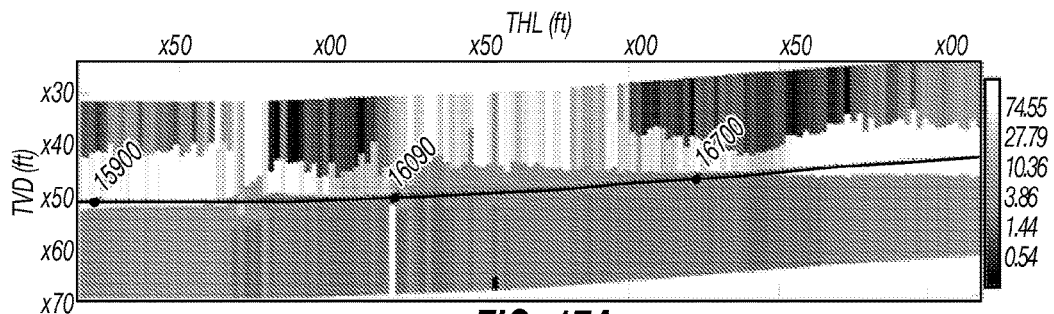
FIG. 17A illustrates an aspect of the graphical results of a one-dimensional inversion.
Figure 17B:
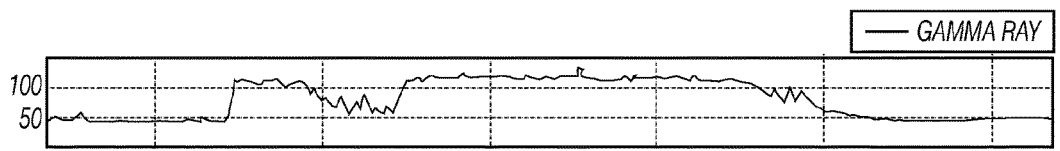
FIG. 17B illustrates an aspect of the graphical results of a gamma ray log.
Figure 17C:
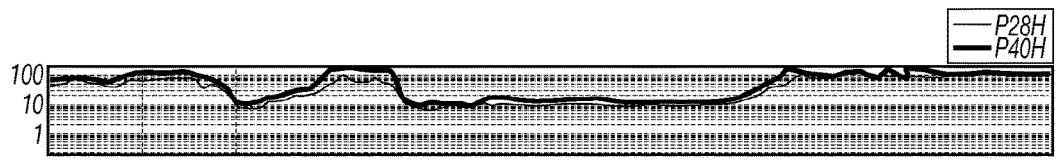
FIG. 17C illustrates an aspect of the graphical results of a one-dimensional inversion response reconstruction of resistivity measurements.
Figure 17D:
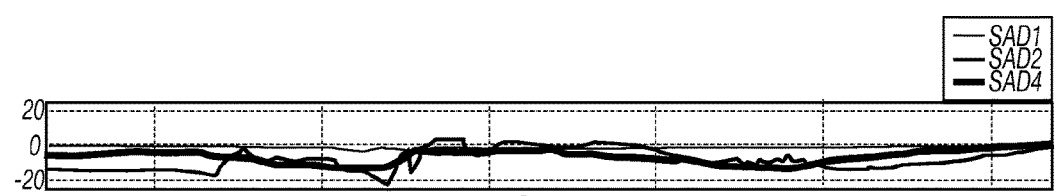
FIG. 17D illustrates an aspect of the graphical results of a one-dimensional inversion response reconstruction of symmetrized directional attenuations.
Figure 17E:
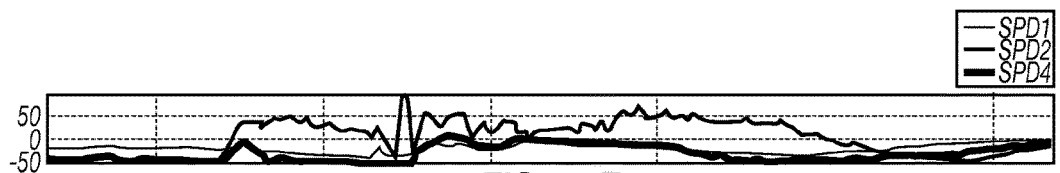
FIG. 17E illustrates an aspect of the graphical results of a one-dimensional inversion response reconstruction of symmetrized directional phase shifts.
Figure 17F:
FIG. 17F illustrates an aspect of a two-dimensional formation model generated from the two-dimensional inversion of a two-dimensional model built from a station-by-station one-dimensional inversion in two sections integrated with the original station-by-station one-dimensional inversion results.

FIGS. 17A-17F illustrate the workflow of FIG. 5 applied to a directional resistivity data set, e.g., the real-time interpretation based on a 1-D inversion and the associated response reconstruction. In one aspect, certain channels of a logging tool are used, e.g., two resistivity channels (P28H and P40H) and six symmetrized directional channels (96-in. spacing at three frequencies—SAD1, SAD4, SAD2, SPD1, SPD4, and SPD2), and using a 10 ft. (e.g., width) data sliding window in the inversion. Two zones with a distortion (e.g., undesirable measurement reconstruction and/or non 1-D signature) corresponding to a fault may be identified and re-processed using the fault inversion. After the (e.g., consistent) boundaries from the 1-D inversions are extracted, the 2-D models may be generated, see, e.g., FIG. 5. Twenty feet of data (e.g., including the fault zone) may be processed to determine the position and angle of the faults. The results of a 2-D inversion overlaid on (e.g., combined with) a 1-D inversion are illustrated in FIG. 17F. FIG. 17F illustrates two different fault intervals, for example, two different models generated separately, e.g., where each has a respective two-dimensional model built and inverted for a fault.

FIG. 17A illustrates an aspect of the graphical results of a one-dimensional inversion. FIG. 17B illustrates an aspect of the graphical results of a gamma ray log. FIG. 17C illustrates an aspect of the graphical results of a one-dimensional inversion response reconstruction of resistivity. FIG. 17D illustrates an aspect of the graphical results of symmetrized directional attenuations. FIG. 17E illustrates an aspect of the graphical results of symmetrized directional phase shifts. FIG. 17F illustrates an aspect of a two-dimensional formation model generated from the two-dimensional inversion of a two-dimensional model built from a deep one-dimensional inversion and a shallow one-dimensional inversion.

Figure 18:
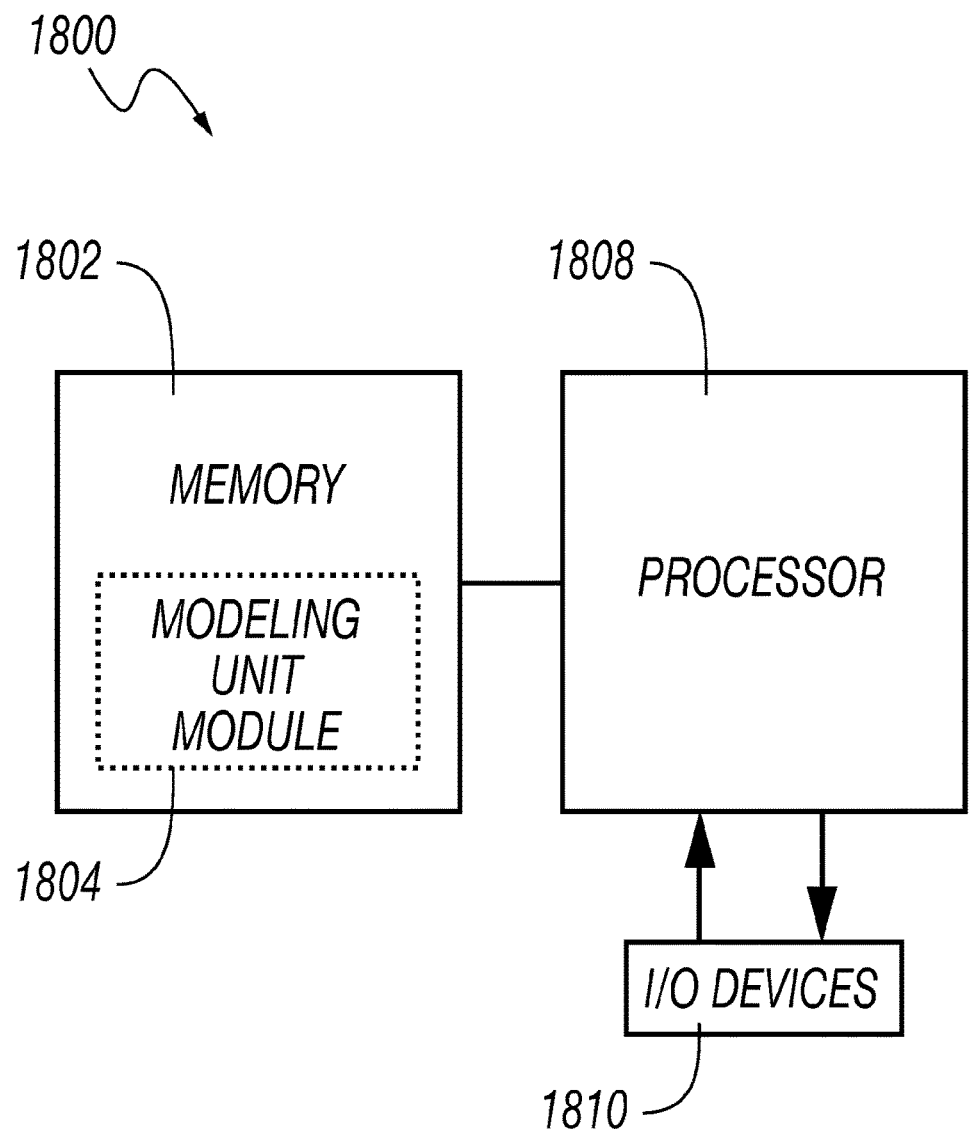
FIG. 18 illustrates an aspect of a block diagram of a computer architecture.

FIG. 18 illustrates an aspect of a block diagram of a computer architecture 1800. Various I/O devices 1810 may be coupled (e.g., via a bus) to processor 1808 (or set of processors), for example, a keyboard, mouse, audio device, display device, and/or communication device. In one aspect, an input device inputs field signal(s) into the memory and/or processor. Memory 1802 may be coupled to processor. Memory 1802 may include a disk drive or other mass storage device which may include instructions/code and data, in one aspect. Note that other architectures are possible.

Aspects of the disclosure disclosed herein may be implemented in hardware, software, firmware, or a combination of such implementation approaches. Aspects of the disclosure may be implemented as computer programs or program code executing on programmable systems comprising at least one processor, a storage system (including volatile and nonvolatile memory and/or storage elements), at least one input device, and at least one output device.

Program code may be applied to input instructions to perform the functions and methods described herein and generate output information (e.g., a formation model). The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The disclosure herein is not limited in scope to any particular programming language. The language may be a compiled or interpreted language.

One or more aspects of at least one aspect may be implemented by representative instructions stored on a machine-readable medium which represents various logic within the processor, which when read by a machine causes the machine to fabricate logic to perform the techniques described herein. Such implementations may be stored on a tangible, machine readable medium.

Such machine-readable storage media may include, without limitation, non-transitory, tangible arrangements of articles manufactured or formed by a machine or device, including storage media such as hard disks, any other type of disk including floppy disks, optical disks, compact disk read memories (CD-ROMs), compact disk rewritable's (CD-RWs), and magneto-optical disks, semiconductor devices such as read memories (ROMs), random access memories (RAMs) such as dynamic random access memories (DRAMs), static random access memories (SRAMs), erasable programmable read memories (EPROMs), flash memories, electrically erasable programmable read memories (EEPROMs), phase change memory (PCM), magnetic or optical cards, or any other type of media suitable for storing electronic instructions.

Accordingly, aspects of the disclosure also include non-transitory, tangible machine-readable media containing instructions or containing design data, such as Hardware Description Language (HDL), which defines structures, circuits, apparatuses, processors and/or system features described herein. Such aspects may also be referred to as program products.

The module may be implemented in software, hardware, firmware, or a combination thereof. The instruction converter may be on processor, off processor, or part on and part off processor.

What is claimed is:

1. A logging system comprising:
   a transmitter to produce an electromagnetic field in a borehole;
   a receiver in the borehole to detect a first field signal induced by the electromagnetic field at a first depth of investigation and a second field signal induced by the electromagnetic field at a second depth of investigation; and
   a modeling unit comprising a processor configured to
      perform a first one-dimensional inversion on the first field signal and a second one-dimensional inversion on the second field signal,
      build a two-dimensional model from the first one-dimensional inversion and the second one-dimensional inversion, and
      perform a two-dimensional inversion on the two-dimensional model to generate a two-dimensional formation model,
   wherein the modeling unit is configured to detect a fault intersected by the borehole,
   wherein the modeling unit is configured to include a position and a dip of the fault in the two-dimensional model, and
   wherein the modeling unit is configured to adjust the position and the dip of the fault when the two-dimensional inversion is performed to generate the two-dimensional formation model.

2. The logging system of claim 1, wherein the modeling unit is configured to detect the fault intersected by the borehole as a distortion in at least one of the first one-dimensional inversion and the second one-dimensional inversion.

3. A logging system comprising:
   a transmitter to produce an electromagnetic field in a borehole;
   a receiver in the borehole to detect a first field signal induced by the electromagnetic field at a first depth of investigation and a second field signal induced by the electromagnetic field at a second depth of investigation; and
   a modeling unit comprising a processor configured to perform a first one-dimensional inversion on the first field signal and a second one-dimensional inversion on the second field signal, build a first two-dimensional model from the first one-dimensional inversion, perform a first two-dimensional inversion on the first two-dimensional model, build a second two-dimensional model from the first one-dimensional inversion and the first two-dimensional inversion, and perform a second two-dimensional inversion on the second two-dimensional model to generate a two-dimensional formation model,
   wherein the modeling unit is configured to detect a fault intersected by the borehole as a distortion in at least one of the first one-dimensional inversion and the second one-dimensional inversion.

4. The logging system of claim 3, wherein the modeling unit is configured to include a position and a dip of the fault in the two-dimensional model.

5. The logging system of claim 4, wherein the modeling unit is configured to adjust the position and the dip of the fault when the two-dimensional inversion is performed to generate the two-dimensional formation model.

6. A method comprising:
producing an electromagnetic field in a borehole;
detecting a first field signal induced by the electromagnetic field at a first depth of investigation and a second field signal induced by the electromagnetic field at a second depth of investigation;
performing a first one-dimensional inversion on the first field signal and a second one-dimensional inversion on the second field signal;
building a two-dimensional model from the first one-dimensional inversion and the second one-dimensional inversion; and
performing a two-dimensional inversion on the two-dimensional model to generate a two-dimensional formation model; and
detecting a fault intersected by the borehole as a distortion in at least one of the first one-dimensional inversion and the second one-dimensional inversion.

7. The method of claim 6, wherein building the two-dimensional model comprises including a position and a dip of the fault in the two-dimensional model.

8. The method of claim 7, wherein performing the two-dimensional inversion comprises adjusting the position and the dip of the fault.

9. A method comprising:
producing an electromagnetic field in a borehole;
detecting a first field signal induced by the electromagnetic field at a first depth of investigation and a second field signal induced by the electromagnetic field at a second depth of investigation;
performing a first one-dimensional inversion on the first field signal and a second one-dimensional inversion on the second field signal;
building a first two-dimensional model from the first one-dimensional inversion;
performing a first two-dimensional inversion on the first two-dimensional model;
building a second two-dimensional model from the first one-dimensional inversion and the first two-dimensional inversion;
performing a second two-dimensional inversion on the second two-dimensional model to generate a two-dimensional formation model; and
detecting a fault intersected by the borehole as a distortion in at least one of the first one-dimensional inversion and the second one-dimensional inversion.

10. The method of claim 9, wherein the building of at least one of the first two-dimensional model and the second two-dimensional model comprises including a position and a dip of the fault in the at least one of the first two-dimensional model and the second two-dimensional model.

11. The method of claim 10, wherein at least one of the performing the first two-dimensional inversion and the performing the second two-dimensional inversion comprises adjusting the position and the dip of the fault.

12. An apparatus comprising:
a set of one or more processors; and
a set of one or more data storage devices that store instructions, that when executed by the set of processors, cause the set of one or more processors to perform the following:
producing an electromagnetic field in a borehole;
detecting a first field signal induced by the electromagnetic field at a first depth of investigation and a second field signal induced by the electromagnetic field at a second depth of investigation;
performing a first one-dimensional inversion on the first field signal and a second one-dimensional inversion on the second field signal;
building a two-dimensional model from the first one-dimensional inversion and the second one-dimensional inversion;
performing a two-dimensional inversion on the two-dimensional model to generate a two-dimensional formation model; and
detecting a fault intersected by the borehole as a distortion in at least one of the first one-dimensional inversion and the second one-dimensional inversion.

13. The apparatus of claim 12, wherein the set of data storage devices further stores instructions, that when executed by the set of processors, cause the set of processors to perform the following:
wherein the building the two-dimensional model comprises including a position and a dip of the fault in the two-dimensional model.

14. The apparatus of claim 13, wherein the set of data storage devices further stores instructions, that when executed by the set of processors, cause the set of processors to perform the following:
wherein the performing the two-dimensional inversion comprises adjusting the position and the dip of the fault.

15. An apparatus comprising:
a set of one or more processors; and
a set of one or more data storage devices that store instructions, that when executed by the set of processors, cause the set of one or more processors to perform the following:
producing an electromagnetic field in a borehole;
detecting a first field signal induced by the electromagnetic field at a first depth of investigation and a second field signal induced by the electromagnetic field at a second depth of investigation;
performing a first one-dimensional inversion on the first field signal and a second one-dimensional inversion on the second field signal;
building a first two-dimensional model from the first one-dimensional inversion;
performing a first two-dimensional inversion on the first two-dimensional model;
building a second two-dimensional model from the first one-dimensional inversion and the first two-dimensional inversion;
performing a second two-dimensional inversion on the second two-dimensional model to generate a two-dimensional formation model; and
detecting a fault intersected by the borehole as a distortion in at least one of the first one-dimensional inversion and the second one-dimensional inversion.

16. The apparatus of claim 15, wherein the set of data storage devices further stores instructions, that when executed by the set of processors, cause the set of processors to perform the following:
wherein the building of at least one of the first two-dimensional model and the second two-dimensional model comprises including a position and a dip of the fault in the at least one of the first two-dimensional model and the second two-dimensional model.

17. The apparatus of claim 16, wherein the set of data storage devices further stores instructions, that when executed by the set of processors, cause the set of processors to perform the following:

wherein at least one of the performing the first two-dimensional inversion and the performing the second two-dimensional inversion comprises adjusting the position and the dip of the fault.

* * * * *